(12) United States Patent
Casey et al.

(10) Patent No.: US 12,255,370 B2
(45) Date of Patent: Mar. 18, 2025

(54) ELECTRODE ASSEMBLY FOR A REDOX FLOW BATTERY

(71) Applicant: ESS TECH, INC., Wilsonville, OR (US)

(72) Inventors: Sean Casey, Oregon City, OR (US); Craig Evans, West Linn, OR (US); Thiago Groberg, Tigard, OR (US); Yang Song, West Linn, OR (US)

(73) Assignee: ESS TECH, INC., Wilsonville, OR (US)

( * ) Notice: Subject to any disclaimer, the term of this patent is extended or adjusted under 35 U.S.C. 154(b) by 39 days.

(21) Appl. No.: 18/296,170

(22) Filed: Apr. 5, 2023

(65) Prior Publication Data
US 2023/0261238 A1    Aug. 17, 2023

Related U.S. Application Data

(63) Continuation of application No. 17/308,913, filed on May 5, 2021, now Pat. No. 11,677,093.

(60) Provisional application No. 63/025,227, filed on May 15, 2020.

(51) Int. Cl.
*H01M 8/248*      (2016.01)
*H01M 8/0247*    (2016.01)
*H01M 8/18*       (2006.01)

(52) U.S. Cl.
CPC ......... *H01M 8/248* (2013.01); *H01M 8/0247* (2013.01); *H01M 8/188* (2013.01)

(58) Field of Classification Search
CPC .................................................. H01M 8/188
See application file for complete search history.

(56) References Cited

U.S. PATENT DOCUMENTS

| | | | |
|---|---|---|---|
| 11,424,471 | B2 | 8/2022 | Fleck et al. |
| 11,502,321 | B2 | 11/2022 | Casey et al. |
| 2011/0281169 | A1 | 11/2011 | Zheng et al. |
| 2013/0157097 | A1 | 6/2013 | Kampanatsanyakorn et al. |
| 2015/0125768 | A1 | 5/2015 | Mosso et al. |
| 2016/0372776 | A1 | 12/2016 | Hsieh et al. |

(Continued)

FOREIGN PATENT DOCUMENTS

| | | |
|---|---|---|
| EP | 3439093 A1 | 2/2019 |
| EP | 4016681 A1 | 6/2022 |

(Continued)

OTHER PUBLICATIONS

ISA Korean Intellectual Property Office, International Search Report and Written Opinion Issued in Application No. PCT/US2021/030970, Aug. 24, 2021, WIPO, 12 pages.

(Continued)

*Primary Examiner* — Brian R Ohara
(74) *Attorney, Agent, or Firm* — McCoy Russell LLP

(57) ABSTRACT

Methods and systems are provided for a redox flow battery system. In one example, the redox flow battery system includes a cell stack compressed between terminal structures defining ends of the redox flow battery. The cell stack may be formed of a plurality of cells where each cell includes a deformable positive electrode in contact with a first face of a membrane separator and a negative electrode configured to be less compressible than the positive electrode and arranged at a second face of the membrane separator.

18 Claims, 8 Drawing Sheets

(56) References Cited

U.S. PATENT DOCUMENTS

| | | |
|---|---|---|
| 2017/0256803 A1 | 9/2017 | Evans et al. |
| 2017/0294658 A1 | 10/2017 | Jin et al. |
| 2017/0346123 A1* | 11/2017 | Loretz .................... H01M 8/20 |
| 2018/0233834 A1* | 8/2018 | Evans .................... H01M 8/188 |
| 2021/0359327 A1 | 11/2021 | Evans et al. |
| 2021/0359328 A1 | 11/2021 | Evans et al. |
| 2021/0359329 A1 | 11/2021 | Evans et al. |
| 2022/0134292 A1 | 5/2022 | Liu et al. |
| 2022/0200030 A1 | 6/2022 | Liu et al. |
| 2022/0200035 A1 | 6/2022 | Kender |
| 2022/0209274 A1 | 6/2022 | Nicholls et al. |

FOREIGN PATENT DOCUMENTS

| | | | |
|---|---|---|---|
| JP | 2019175833 A | 10/2019 | |
| KR | 20130075130 A | 7/2013 | |
| WO | 2018044236 A1 | 3/2018 | |
| WO | WO-2019025190 A1 * | 2/2019 | .............. H01M 4/02 |

OTHER PUBLICATIONS

European Patent Office, Extended European Search Report Issued in Application No. 21803329.8, Nov. 15, 2024, Germany, 12 pages.

* cited by examiner

ELECTRODE ASSEMBLY FOR A REDOX FLOW BATTERY

CROSS-REFERENCE TO RELATED APPLICATIONS

The present application is a continuation of U.S. Non-Provisional application Ser. No. 17/308,913, entitled "ELECTRODE ASSEMBLY FOR A REDOX FLOW BATTERY," and filed on May 5, 2021. Application Ser. No. 17/308,913 claims priority to Provisional Application No. 63/025,227, entitled "ELECTRODE ASSEMBLY FOR A REDOX FLOW BATTERY," and filed on May 15, 2020. The entirety of the above-listed application is hereby incorporated by reference for all purposes.

FIELD

The present description relates generally to methods and systems for a redox flow battery.

BACKGROUND AND SUMMARY

Redox flow batteries are suitable for grid scale storage applications due to their capability for scaling power and capacity independently, as well as for charging and discharging over thousands of cycles with reduced performance losses in comparison to conventional battery technologies. An all-iron hybrid redox flow battery is particularly attractive due to incorporation of low cost, earth-abundant materials. The iron redox flow battery (IFB) relies on iron, salt, and water for electrolyte, thus comprising simple, earth abundant, and inexpensive materials and eliminates incorporation of harsh chemicals thereby allowing the IFB to impose minimal negative impact on the environment.

An electrochemical cell of the IFB may include a positive electrode, a membrane separator, a negative electrode, and a bipolar plate, arranged in a stack. In some examples, the bipolar plate may be a net-shape molded structure, adapted with interdigitated flow field (IDFF) channels to direct electrolyte flow through the cell. The bipolar plate is positioned between the negative electrode and a first face of the positive electrode and the membrane separator is positioned between a second, opposite face of the positive electrode and a negative electrode of an adjacent cell. The positive electrode may be formed from a gas diffusion layer (GDL) paper, for example, which may be compressed onto the bipolar plate, over the IDFF channels. By implementing the positive electrode as a flow-through porous electrode in combination with the IDFF channels of the bipolar plate, a performance of the IFB may be enhanced.

However, the inventors herein have recognized that forming the positive electrode from the GDL paper may hinder electrolyte flow through the IDFF channels of the bipolar plate. For example, high GDL paper compression pressures may be needed to enable sufficient electrolyte mass transport over the IDFF channels. Such high pressures may demand use of higher load bearing IFB components, driving up costs. IFB system costs may be further exacerbated by the use of costly GDL paper materials to form the positive electrode.

In one example, the issues described above may be addressed by a redox flow battery system including a cell stack compressed between terminal structures defining ends of the redox flow battery, the cell stack formed of a plurality of cells, and wherein each cell of the plurality of cells includes, a deformable positive electrode having a permeability based on a mechanical compression of the positive electrode and in face-sharing contact with a first face of a membrane separator, a negative electrode configured to be less compressible than the positive electrode and arranged at a second face of the membrane separator opposite from the positive electrode, and an electrolyte in contact with the positive electrode. In this way, an iron redox flow battery (IFB) system may include a low cost electrode assembly that promotes high battery performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-10 are shown approximately to scale, however, other dimensions may be used as desired.

DETAILED DESCRIPTION

Figure 1:
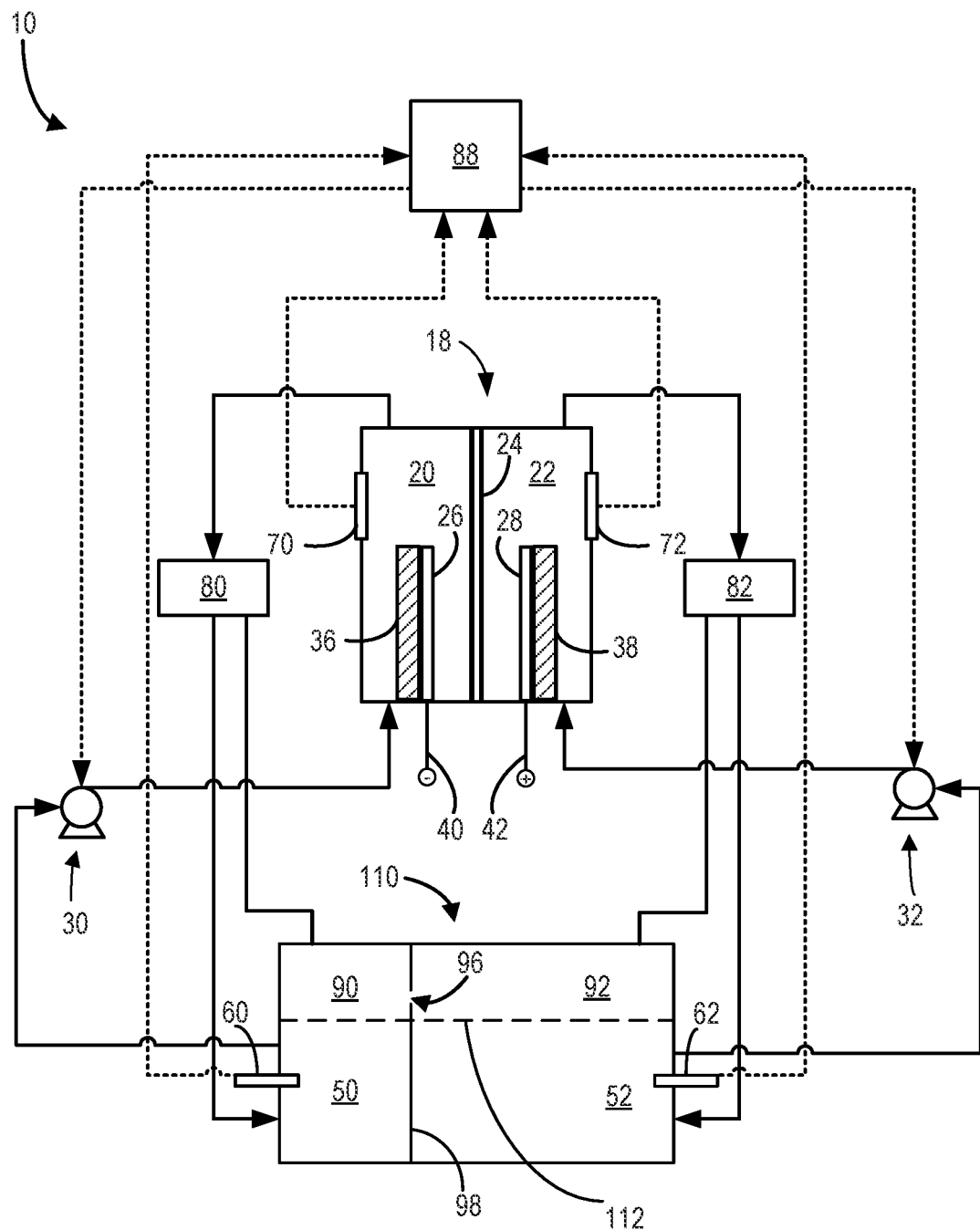
FIG. 1 shows a schematic of an example redox flow battery system including a battery cell with electrodes and a membrane separator.
Figure 2:
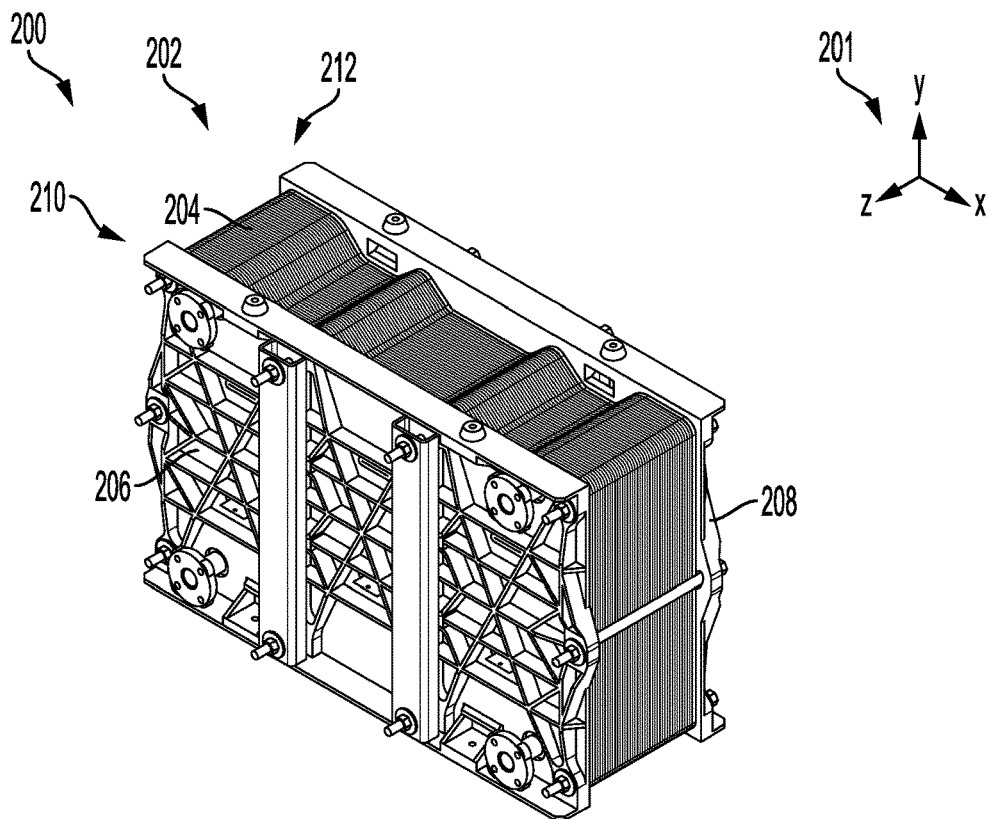
FIG. 2 shows a perspective view of a first embodiment of a redox flow battery system.
Figure 3:
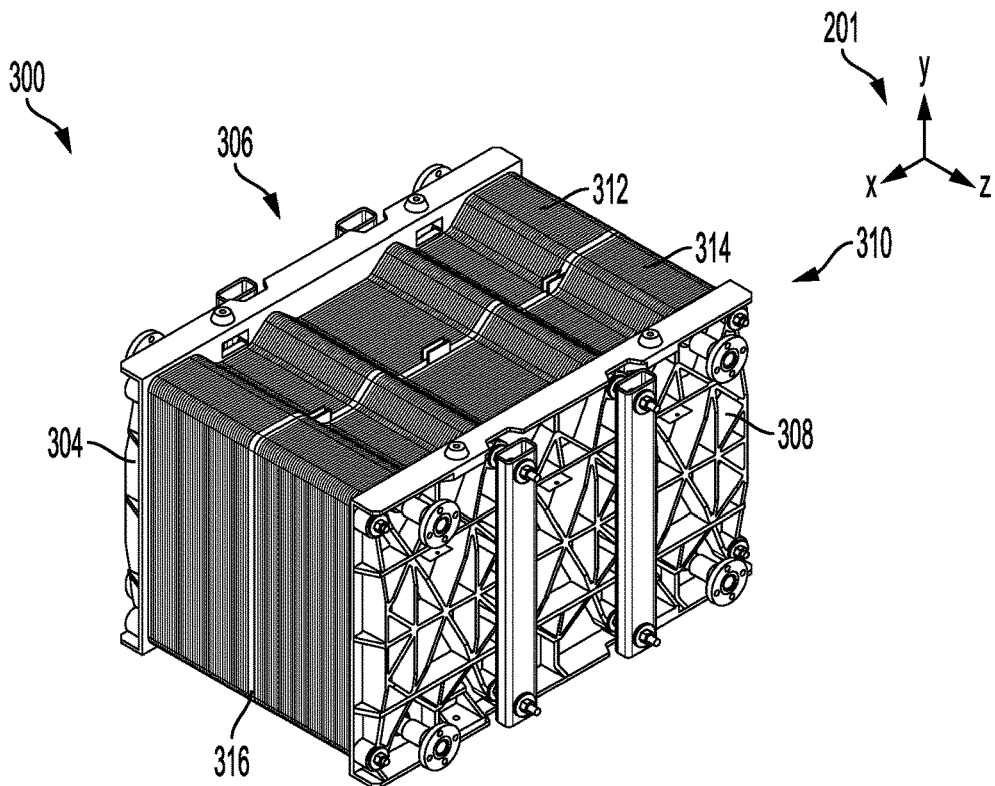
FIG. 3 shows a perspective view of a second embodiment of a redox flow battery system.
Figure 6:
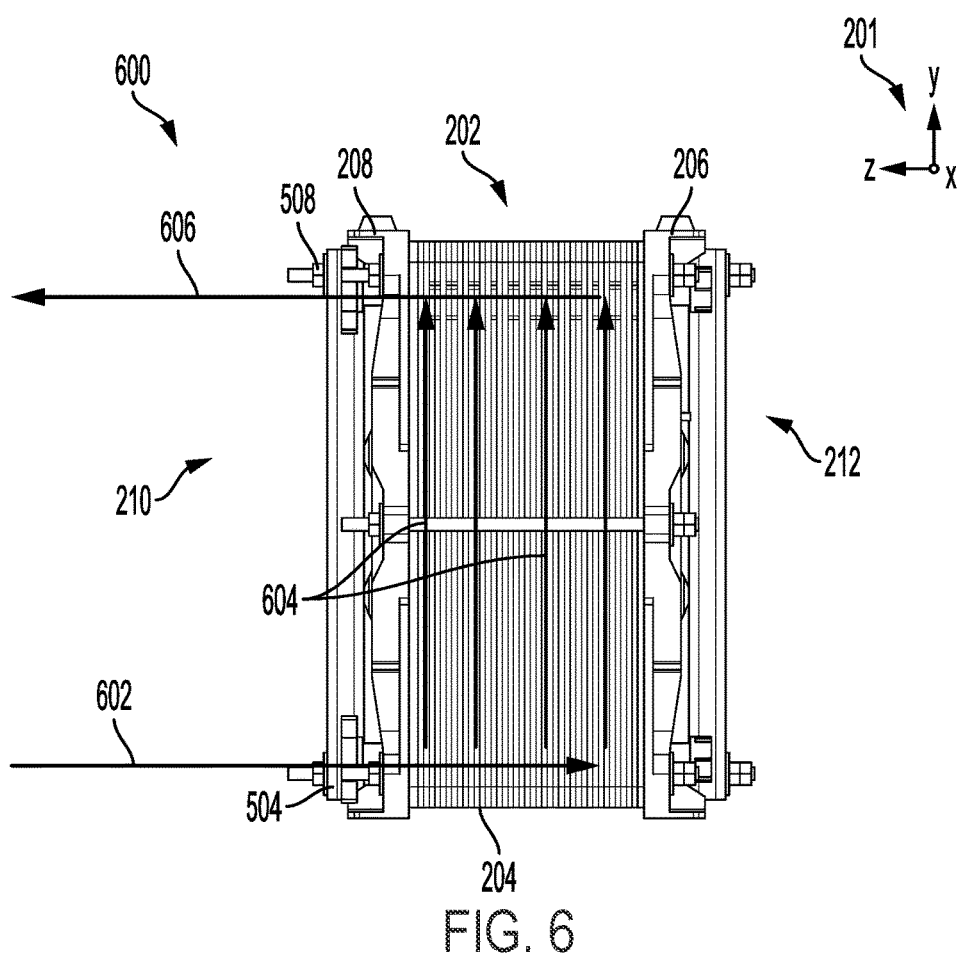
FIG. 6 shows a side view of the first embodiment of the redox flow battery system of FIG. 2.
Figure 7:
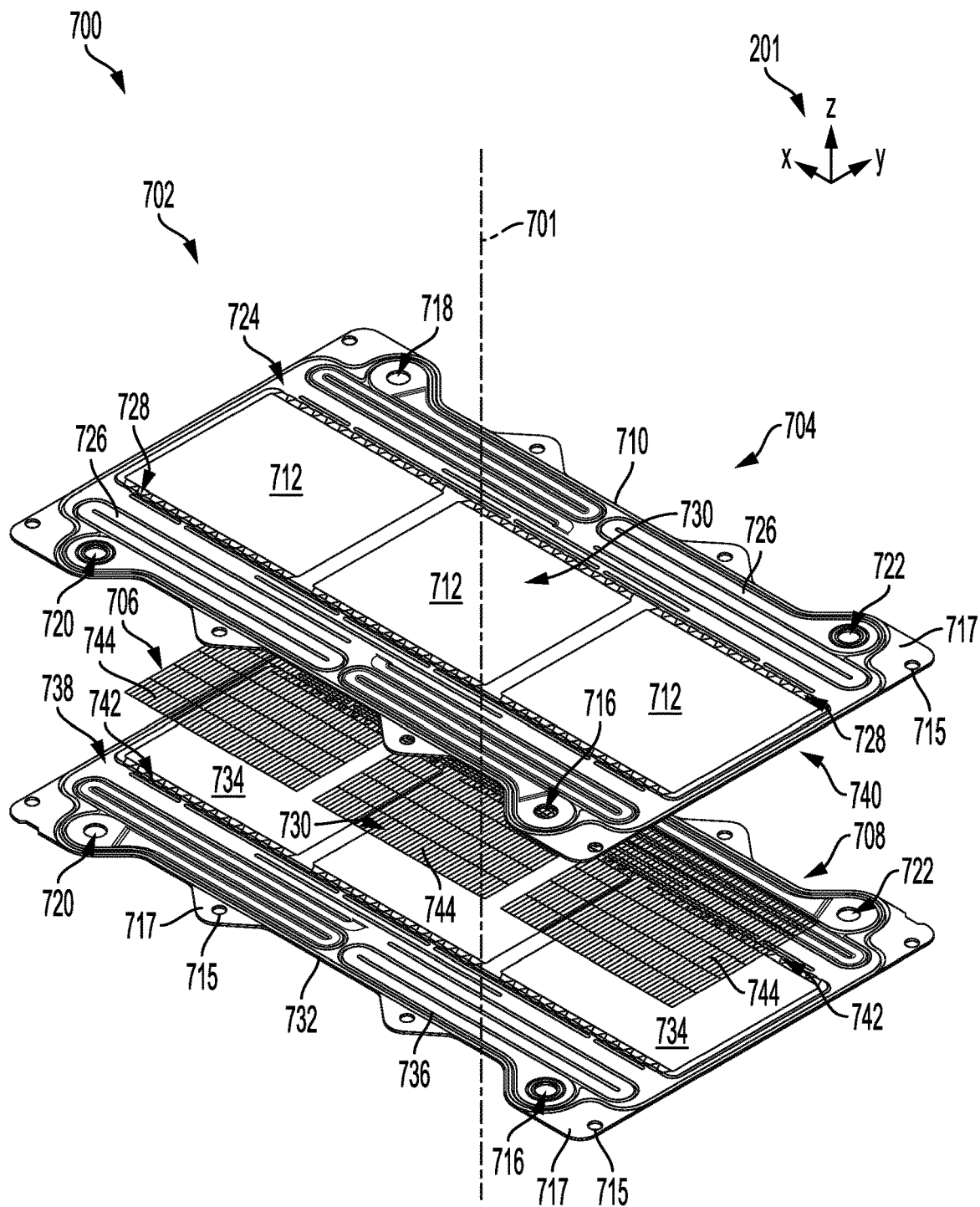
FIG. 7 shows an exploded view of a first example of an electrode assembly which may be implemented in a redox flow battery system.
Figure 9:
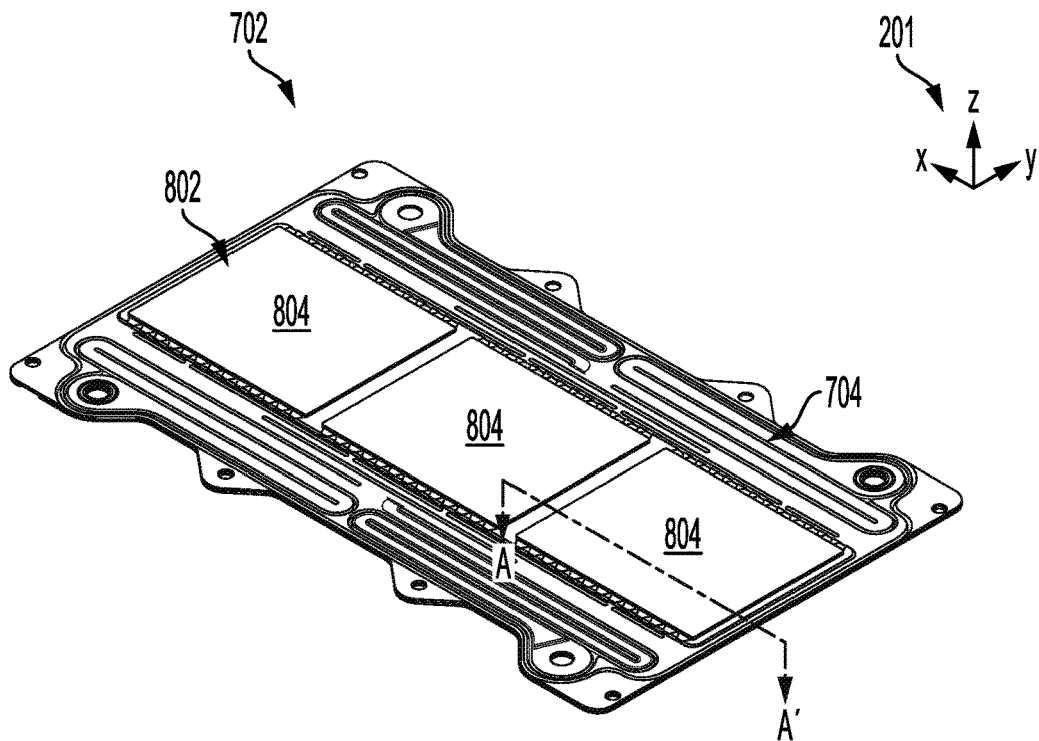
FIG. 9 shows the electrode assembly of FIG. 8 fully assembled.
Figure 10:
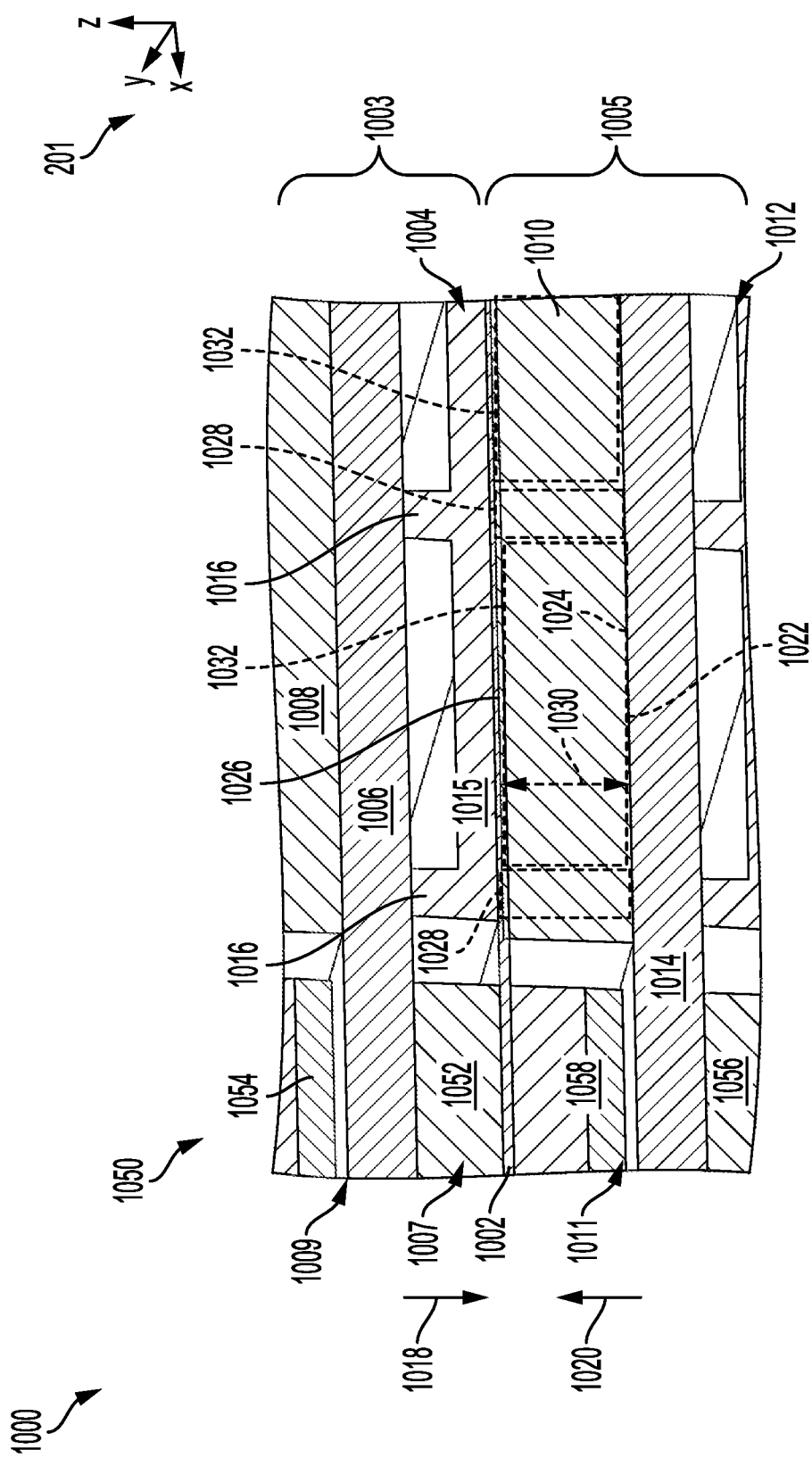
FIG. 10 shows a first cross-section of a portion of a first example of a cell stack.
Figure 11:
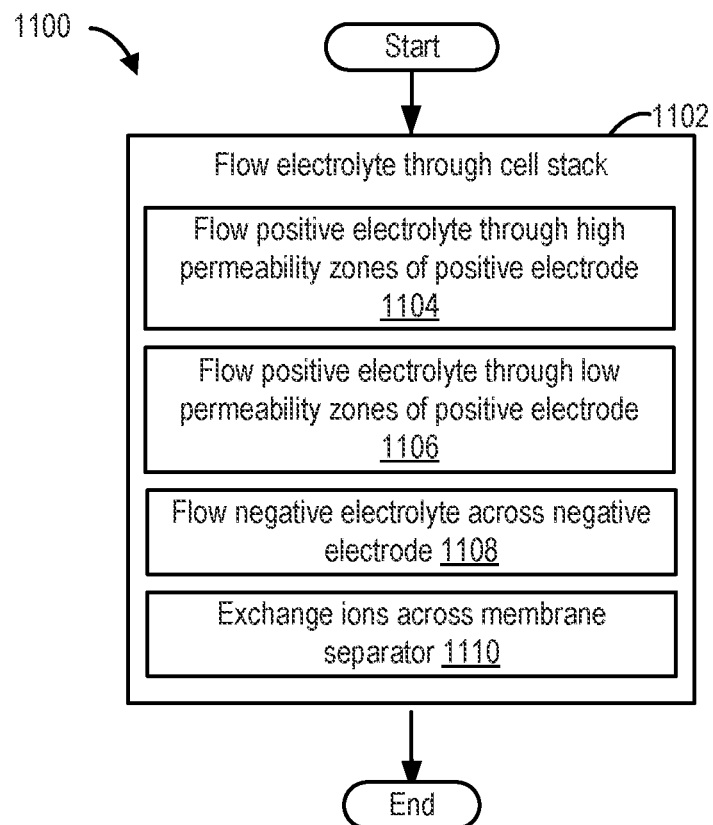
FIG. 11 shows an example of a method for manufacturing an electrode assembly for a redox flow battery system.

The following description relates to systems and methods for manufacturing a redox flow battery with reduced cost of storage. The redox flow battery is shown in FIG. 1 with an integrated multi-chamber tank having separate positive and negative electrolyte chambers. In some examples, the redox flow battery may be an all-iron flow battery (IFB) utilizing iron redox chemistry at both a negative and a positive electrode of the IFB. The electrolyte chambers may be coupled to one or more battery cells, each cell comprising the negative electrode and the positive electrode. The one or more battery cells may be stacked along a common axis to form a cell stack which may be sandwiched between terminal structures such as pressure plates, as shown in FIG. 2 in a perspective view of a first embodiment of the IFB as well as in an exploded view depicted in FIG. 4. The IFB may have more than one cell stack, as illustrated in FIG. 3 in a second embodiment of the IFB. Electrolyte may flow in and out of the IFB via a plurality of inlets and outlets in at least one of the pressure plates. The plurality of inlets and outlets are shown in a rear view of the IFB in FIG. 5 and an electrolyte flow path through the IFB is indicated in FIG. 6 in a side view of the IFB. Each cell of the cell stack of the IFB may include an electrode assembly formed of the positive and negative electrodes, a bipolar plate, and a membrane separator. The positive electrode may be formed from a sheet of felt, allowing the positive electrode to be porous and deformable with a permeability which may be varied based on compression. An exploded view of a first example of the electrode assembly, without the positive electrode, is shown in FIG. 7. The positive electrode may be coupled to the electrode assembly, in contact with bipolar plates of the electrode assembly, as shown in a partially exploded view in FIG. 8 and fully assembled in FIG. 9. A detailed cutaway view of the cell stack is illustrated in FIG. 10, showing interfaces between the components of the electrode assembly and regions of high and low permeability along the positive electrode. A method for manufacturing a low cost electrode assembly, such as the electrode assembly of FIG. 10 where the electrode assembly includes a positive electrode formed from felt, is shown in FIG. 11.

FIGS. 2-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Hybrid redox flow batteries are redox flow batteries that are characterized by the deposition of one or more of the electro-active materials as a solid layer on an electrode. Hybrid redox flow batteries may, for instance, include a chemical that plates via an electrochemical reaction as a solid on a substrate throughout the battery charge process. During battery discharge, the plated species may ionize via an electrochemical reaction, becoming soluble in the electrolyte. In hybrid battery systems, the charge capacity (e.g., a maximum amount of energy stored) of the redox battery may be limited by the amount of metal plated during battery charge and may depend accordingly on the efficiency of the plating system as well as the available volume and surface area available for plating.

As shown in FIG. 1, in a redox flow battery system 10, a negative electrode 26 may be referred to as a plating electrode and a positive electrode 28 may be referred to as a redox electrode. A negative electrolyte within a plating side (e.g., a negative electrode compartment 20) of a battery cell 18 may be referred to as a plating electrolyte, and a positive electrolyte on a redox side (e.g. a positive electrode compartment 22) of the battery cell 18 may be referred to as a redox electrolyte. In some examples, the negative electrode 26 may be formed of a mesh and act as a spacer between a first bipolar plate 36 and a membrane separator 24. The positive electrode 28 may be formed of a porous and deformable felt and a permeability of the felt may varied based on an amount of compression applied to the felt, where the permeability affects electrolyte flow through the positive electrode compartment 22 of the battery cell 18. Details of the negative electrode 26 and the positive electrode 28 are described further below with reference to FIGS. 7-11.

Anode refers to the electrode where electro-active material loses electrons and cathode refers to the electrode where electro-active material gains electrons. During battery charge, the positive electrolyte gains electrons at the negative electrode 26; therefore the negative electrode 26 is the cathode of the electrochemical reaction. During discharge, the positive electrolyte loses electrons; therefore the negative electrode 26 is the anode of the reaction. Alternatively, during discharge, the negative electrolyte and negative electrode may be respectively referred to as an anolyte and anode of the electrochemical reaction, while the positive electrolyte and the positive electrode may be respectively referred to as a catholyte and cathode of the electrochemical reaction. During charge, the negative electrolyte and negative electrode may be respectively referred to as the catholyte and cathode of the electrochemical reaction, while the positive electrolyte and the positive electrode may be respectively referred to as the anolyte and anode of the electrochemical reaction. For simplicity, the terms positive and negative are used herein to refer to the electrodes, electrolytes, and electrode compartments in redox battery flow systems.

One example of a hybrid redox flow battery is an all iron redox flow battery (IFB), in which the electrolyte comprises iron ions in the form of iron salts (e.g., $FeCl_2$, $FeCl_3$, and the like), wherein the negative electrode comprises metal iron. For example, at the negative electrode 26, ferrous ion, $Fe^{2+}$, receives two electrons and plates as iron metal on to the negative electrode 26 during battery charge, and iron metal, $Fe^0$, loses two electrons and re-dissolves as $Fe^{2+}$ during battery discharge. At the positive electrode, $Fe^{2+}$ loses an electron to form ferric ion, $Fe^{3+}$, during charge, and during discharge $Fe^{3+}$ gains an electron to form $Fe^{2+}$. The electrochemical reaction is summarized in equations (1) and (2), wherein the forward reactions (left to right) indicate electrochemical reactions during battery charge, while the reverse reactions (right to left) indicate electrochemical reactions during battery discharge:

$$Fe^{2+}+2e-\leftrightarrow Fe^0-0.44 \text{ V (Negative Electrode)} \tag{1}$$

$$Fe^{2+}\leftrightarrow 2Fe^{3+}+2e-+0.77 \text{ V (Positive Electrode)} \tag{2}$$

As discussed above, the negative electrolyte used in the IFB may provide a sufficient amount of $Fe^{2+}$ so that, during charge, $Fe^{2+}$ can accept two electrons from the negative electrode to form $Fe^0$ and plate onto a substrate. During discharge, the plated $Fe^0$ may then lose two electrons, ionizing into $Fe^{2+}$ and may be dissolved back into the electrolyte. The equilibrium potential of the above reaction is −0.44 V and thus, this reaction provides a negative terminal for the desired system. On the positive side of the IFB, the electrolyte may provide $Fe^{2+}$ during charge which loses electron and oxidizes to $Fe^{3+}$. During discharge, $Fe^{3+}$ provided by the electrolyte becomes $Fe^{2+}$ by absorbing an electron provided by the electrode. The equilibrium potential of this reaction is +0.77 V, creating a positive terminal for the desired system.

The IFB provides the ability to charge and recharge its electrolytes in contrast to other battery types utilizing non-regenerating electrolytes. Charge is achieved by applying a current across the electrodes via terminals 40 and 42. The negative electrode 26 may be coupled via terminal 40 to the negative side of a voltage source so that electrons may be delivered to the negative electrolyte via the positive electrode (e.g., as $Fe^{2+}$ is oxidized to $Fe^{3+}$ in the positive electrolyte in the positive electrode compartment 22). The electrons provided to the negative electrode 26 (e.g., plating electrode) can reduce the $Fe^{2+}$ in the negative electrolyte to form $Fe^0$ at the plating substrate, causing it to plate onto the negative electrode 26.

Discharge can be sustained while $Fe^0$ remains available to the negative electrolyte for oxidation and while $Fe^{3+}$ remains available in the positive electrolyte for reduction. As an example, $Fe^{3+}$ availability can be maintained by increasing the concentration or the volume of the positive electrolyte to the positive electrode compartment 22 side of cell 18 to provide additional $Fe^{3+}$ ions via an external source, such as an external positive electrolyte tank 52. More commonly, availability of $Fe^0$ during discharge may be an issue in IFB systems, wherein the $Fe^0$ available for discharge may be proportional to the surface area and volume of the negative electrode substrate as well as the plating efficiency. Charge capacity may be dependent on the availability of $Fe^{2+}$ in the negative electrode compartment 20. As an example, $Fe^{2+}$ availability can be maintained by providing additional $Fe^{2+}$ ions via an external source, such as an external negative electrolyte chamber 50 to increase the concentration or the volume of the negative electrolyte to the negative electrode compartment 20 side of cell 18.

In an IFB, the positive electrolyte comprises ferrous ion, ferric ion, ferric complexes, or any combination thereof, while the negative electrolyte comprises ferrous ion or ferrous complexes, depending on the state of charge of the IFB system. As previously mentioned, utilization of iron ions in both the negative electrolyte and the positive electrolyte allows for utilization of the same electrolytic species on both sides of the battery cell, which can reduce electrolyte cross-contamination and can increase the efficiency of the IFB system, resulting in less electrolyte replacement as compared to other redox flow battery systems.

Efficiency losses in an IFB may result from electrolyte crossover through the separator 24 (e.g., ion-exchange membrane barrier, micro-porous membrane, and the like). For example, ferric ions in the positive electrolyte may be driven toward the negative electrolyte by a ferric ion concentration gradient and an electrophoretic force across the separator. Subsequently, ferric ions penetrating the membrane barrier and crossing over to the negative electrode compartment 20 may result in coulombic efficiency losses. Ferric ions crossing over from the low pH redox side (e.g., more acidic positive electrode compartment 22) to high pH plating side (e.g., less acidic negative electrode compartment 20) may result in precipitation of $Fe(OH)_3$. Precipitation of $Fe(OH)_3$ may degrade the separator 24 and cause permanent battery performance and efficiency losses. For example, $Fe(OH)_3$ precipitate may chemically foul the organic functional group of an ion-exchange membrane or physically clog the small micro-pores of an ion-exchange membrane. In either case, due to the $Fe(OH)_3$ precipitate, membrane ohmic resistance may rise over time and battery performance may degrade. Precipitate may be removed by washing the battery with acid, but the constant maintenance and downtime may be disadvantageous for commercial battery applications. Furthermore, washing may be dependent on regular preparation of electrolyte, contributing to additional processing costs and complexity. Alternatively, adding specific organic acids to the positive electrolyte and the negative electrolyte in response to electrolyte pH changes may mitigate precipitate formation during battery charge and discharge cycling without driving up overall costs. Additionally, implementing a membrane barrier that inhibits ferric ion cross-over may also mitigate fouling.

Additional coulombic efficiency losses may be caused by reduction of $H^+$ (e.g., protons) and subsequent formation of $H_2$ (e.g., hydrogen gas), and the reaction of protons in the negative electrode compartment 20 with electrons supplied at the plated iron metal electrode to form hydrogen gas.

The IFB electrolyte (e.g., $FeCl_2$, $FeCl_3$, $FeSO_4$, $Fe_2(SO_4)_3$, and the like) is readily available and can be produced at low costs. The IFB electrolyte offers higher reclamation value because the same electrolyte can be used for the negative electrolyte and the positive electrolyte, consequently reducing cross contamination issues as compared to other systems. Furthermore, owing to its electron configuration, iron may solidify into a generally uniform solid structure during plating thereof on the negative electrode substrate. For zinc and other metals commonly used in hybrid redox batteries, solid dendritic structures may form during plating. The stable electrode morphology of the IFB system may increase the efficiency of the battery in comparison to other redox flow batteries. Further still, iron redox flow batteries reduce the use of toxic raw materials and can operate at a relatively neutral pH as compared to other redox flow battery electrolytes. Accordingly, IFB systems reduce environmental hazards as compared with all other current advanced redox flow battery systems in production.

Continuing with FIG. 1, a schematic illustration of the redox flow battery system 10 is shown. The redox flow battery system 10 may include the redox flow battery cell 18 fluidly connected to a multi-chambered electrolyte storage tank 110. The redox flow battery cell 18 may generally include the negative electrode compartment 20, separator 24, and positive electrode compartment 22. The separator 24 may include an electrically insulating ionic conducting barrier which prevents bulk mixing of the positive electrolyte and the negative electrolyte while allowing conductance of specific ions therethrough. For example, the separator 24 may include an ion-exchange membrane and/or a microporous membrane.

The negative electrode compartment 20 may include the negative electrode 26, and the negative electrolyte may be formed of electroactive materials. The positive electrode compartment 22 may include the positive electrode 28, and the positive electrolyte may be formed of electroactive materials. In some examples, multiple redox flow battery cells 18 may be combined in series or parallel to generate a higher voltage or current in a redox flow battery system. Further illustrated in FIG. 1 are negative and positive electrolyte pumps 30 and 32, both used to pump electrolyte solution through the flow battery system 10. Electrolytes are stored in one or more tanks external to the cell, and are pumped via negative and positive electrolyte pumps 30 and 32 through the negative electrode compartment 20 side and the positive electrode compartment 22 side of the battery, respectively.

The redox flow battery system 10 may also include the first bipolar plate 36 and a second bipolar plate 38, each positioned along a rear-facing side, e.g., opposite of a side facing the separator 24, of the negative electrode 26 and the positive electrode 28, respectively. The first bipolar plate 36 may be in contact with the negative electrode 26 and the second bipolar plate 38 may be in contact with the positive electrode 28. In other examples, however, the bipolar plates may be arranged proximate but spaced away from the electrodes within the respective electrode compartments. The IFB electrolytes may be transported to reaction sites at the negative and positive electrodes 26 and 28 by the first and second bipolar plates 36 and 38, resulting from conductive properties of a material of the bipolar plates 36, 38. Electrolyte flow may also be assisted by the negative and positive electrolyte pumps 30 and 32, facilitating forced convection through the redox flow battery cell 18. Reacted electrochemical species may also be directed away from the reaction sites by the combination of forced convection and the presence of the first and second bipolar plates 36 and 38.

As illustrated in FIG. 1, the redox flow battery cell 18 may further include negative battery terminal 40, and positive battery terminal 42. When a charge current is applied to the battery terminals 40 and 42, the positive electrolyte is oxidized (lose one or more electrons) at the positive electrode 28, and the negative electrolyte is reduced (gain one or more electrons) at the negative electrode 26. During battery discharge, reverse redox reactions occur on the electrodes. In other words, the positive electrolyte is reduced (gain one or more electrons) at the positive electrode 28, and the negative electrolyte is oxidized (lose one or more electrons) at the negative electrode 26. The electrical potential difference across the battery is maintained by the electrochemical redox reactions in the positive electrode compartment 22 and the negative electrode compartment 20, and may induce a current through a conductor while the reactions are sustained. The amount of energy stored by a redox battery is limited by the amount of electro-active material available in electrolytes for discharge, depending on the total volume of electrolytes and the solubility of the electro-active materials.

The flow battery system 10 may further include the integrated multi-chambered electrolyte storage tank 110. The multi-chambered storage tank 110 may be divided by a bulkhead 98. The bulkhead 98 may create multiple chambers within the storage tank so that both the positive and negative electrolyte may be included within a single tank. The negative electrolyte chamber 50 holds negative electrolyte formed of electroactive materials, and the positive electrolyte chamber 52 holds positive electrolyte formed of electroactive materials. The bulkhead 98 may be positioned within the multi-chambered storage tank 110 to yield a desired volume ratio between the negative electrolyte chamber 50 and the positive electrolyte chamber 52. In one example, the bulkhead 98 may be positioned to set the volume ratio of the negative and positive electrolyte chambers according to the stoichiometric ratio between the negative and positive redox reactions. The figure further illustrates the fill height 112 of storage tank 110, which may indicate the liquid level in each tank compartment. The figure also shows gas head space 90 located above the fill height 112 of negative electrolyte chamber 50, and gas head space 92 located above the fill height 112 of positive electrolyte chamber 52. The gas head space 92 may be utilized to store hydrogen gas generated through operation of the redox flow battery (e.g., due to proton reduction and corrosion side reactions) and conveyed to the multi-chambered storage tank 110 with returning electrolyte from the redox flow battery cell 18. The hydrogen gas may be separated spontaneously at the gas-liquid interface (e.g., fill height 112) within the multi-chambered storage tank 110, thereby precluding having additional gas-liquid separators as part of the redox flow battery system. Once separated from the electrolyte, the hydrogen gas may fill the gas head spaces 90 and 92. As such, the stored hydrogen gas can aid in purging other gases from the multi-chamber storage tank 110, thereby acting as an inert gas blanket for reducing oxidation of electrolyte species, which can help to reduce redox flow battery capacity losses. In this way, utilizing the integrated multi-chambered storage tank 110 may forego having separate negative and positive electrolyte storage tanks, hydrogen storage tanks, and gas-liquid separators common to conventional redox flow battery systems, thereby simplifying the system design, reducing the physical footprint of the system, and reducing system costs.

FIG. 1 also shows the spill over-hole 96, which creates an opening in the bulkhead 98 between gas head spaces 90 and 92, and provides a means of equalizing gas pressure between the two chambers. The spill over hole 96 may be positioned a threshold height above the fill height 112. The spill over hole further enables a capability to self-balance the electrolytes in each of the positive and negative electrolyte chambers in the event of a battery crossover. In the case of an all iron redox flow battery system, the same electrolyte ($Fe^{2+}$) is used in both negative and positive electrode compartments 20 and 22, so spilling over of electrolyte between the negative and positive electrolyte chambers 50 and 52 may reduce overall system efficiency, but the overall electrolyte composition, battery module performance, and battery module capacity are maintained. Flange fittings may be utilized for all piping connections for inlets and outlets to and from the multi-chambered storage tank 110 to maintain a continuously pressurized state without leaks. The multi-chambered storage tank 110 can include at least one outlet from each of the negative and positive electrolyte chambers, and at least one inlet to each of the negative and positive electrolyte chambers. Furthermore, one or more outlet connections may be provided from the gas head spaces 90 and 92 for directing hydrogen gas to rebalancing reactors 80 and 82.

Although not shown in FIG. 1, integrated multi-chambered electrolyte storage tank 110 may further include one or more heaters thermally coupled to each of the negative electrolyte chamber 50 and the positive electrolyte chamber 52. In alternate examples, only one of the negative and positive electrolyte chambers may include one or more heaters. In the case where only the positive electrolyte chamber 52 includes one or more heaters, the negative electrolyte may be heated by transferring heat generated at the battery cells of the power module to the negative electrolyte. In this way, the battery cells of the power module may heat and facilitate temperature regulation of the negative electrolyte. The one or more heaters may be actuated by the controller 88 to regulate a temperature of the negative electrolyte chamber 50 and the positive electrolyte chamber 52 independently or together. For example, in response to an electrolyte temperature decreasing below a threshold temperature, the controller 88 may increase a power supplied to one or more heaters so that a heat flux to the electrolyte is increased. The electrolyte temperature may be indicated by one or more temperature sensors mounted at the multi-chambered electrolyte storage tank 110, including sensors 60 and 62. As examples, the one or more heaters may include coil type heaters or other immersion heaters immersed in the electrolyte fluid, or surface mantle type heaters that transfer heat conductively through the walls of the negative and positive electrolyte chambers to heat the fluid therein. Other known types of tank heaters may be employed without departing from the scope of the present disclosure. Furthermore, controller 88 may deactivate one or more heaters in the negative and positive electrolyte chambers 50, 52 in response to a liquid level decreasing below a solids fill threshold level. Said in another way, controller 88 may activate the one or more heaters in the negative and positive electrolyte chambers 50, 52 only in response to a liquid level increasing above the solids fill threshold level. In this way, activating the one or more heaters without sufficient liquid in the positive and/or negative electrolyte chambers can be averted, thereby reducing a risk of overheating or burning out the heaters.

Further still, one or more inlet connections may be provided to each of the negative and positive electrolyte chambers 50, 52 from a field hydration system (not shown). In this way, the field hydration system can facilitate commissioning of the redox flow battery system, including installing, filling, and hydrating the system, at an end-use location. Furthermore, prior to its commissioning at the end-use location, the redox flow battery system may be dry-assembled at a battery manufacturing facility different from end-use location without filling and hydrating the system, before delivering the system to the end-use location. In one example, the end-use location may correspond to the location where the redox flow battery system 10 is to be installed and utilized for on-site energy storage. Said in another way, it is anticipated that, once installed and hydrated at the end-use location, a position of the redox flow battery system 10 becomes fixed, and the redox flow battery system 10 is no longer deemed a portable, dry system. Thus, from the perspective of a redox flow battery system end-user, the dry portable redox flow battery system 10 may be delivered on-site, after which the redox flow battery system 10 is installed, hydrated and commissioned. Prior to hydration the redox flow battery system 10 may be referred to as a dry, portable system, the redox flow battery system 10 being free of or without water and wet electrolyte. Once hydrated, the redox flow battery system 10 may be referred to as a wet non-portable system, the redox flow battery system 10 including wet electrolyte.

Further illustrated in FIG. 1, electrolyte solutions typically stored in the multi-chambered storage tank 110 are pumped via negative and positive electrolyte pumps 30 and 32 throughout the flow battery system 10. Electrolyte stored in negative electrolyte chamber 50 is pumped via negative electrolyte pump 30 through the negative electrode compartment 20 side, and electrolyte stored in positive electrolyte chamber 52 is pumped via positive electrolyte pump 32 through the positive electrode compartment 22 side of the battery.

Two electrolyte rebalancing reactors 80 and 82, may be connected in-line or in parallel with the recirculating flow paths of the electrolyte at the negative and positive sides of the battery cell 18, respectively, in the redox flow battery system 10. One or more rebalancing reactors may be connected in-line with the recirculating flow paths of the electrolyte at the negative and positive sides of the battery, and other rebalancing reactors may be connected in parallel, for redundancy (e.g., a rebalancing reactor may be serviced without disrupting battery and rebalancing operations) and for increased rebalancing capacity. In one example, the electrolyte rebalancing reactors 80 and 82 may be placed in the return flow path from the positive and negative electrode compartments 20 and 22 to the positive and negative electrolyte chambers 50 and 52, respectively. Electrolyte rebalancing reactors 80 and 82 may serve to rebalance electrolyte charge imbalances in the redox flow battery system occurring due to side reactions, ion crossover, and the like, as described herein. In one example, electrolyte rebalancing reactors 80 and 82 may include trickle bed reactors, where the hydrogen gas and electrolyte are contacted at catalyst surfaces in a packed bed for carrying out the electrolyte rebalancing reaction. In other examples the rebalancing reactors 80 and 82 may include flow-through type reactors that are capable of contacting the hydrogen gas and the electrolyte liquid and carrying out the rebalancing reactions in the absence of a packed catalyst bed.

During operation of the redox flow battery system 10, sensors and probes may monitor and control chemical properties of the electrolyte such as electrolyte pH, concentration, state of charge, and the like. For example, as illustrated in FIG. 1, sensors 62 and 60 maybe be positioned to monitor positive electrolyte and negative electrolyte conditions at the positive electrolyte chamber 52 and the negative electrolyte chamber 50, respectively. In another example, sensors 62 and 60 may each include one or more electrolyte level sensors to indicate a level of electrolyte in the positive electrolyte chamber 52 and the negative electrolyte chamber 50, respectively. As another example, sensors 72 and 70, also illustrated in FIG. 1, may monitor positive electrolyte and negative electrolyte conditions at the positive electrode compartment 22 and the negative electrode compartment 20, respectively. Sensors may be positioned at other locations throughout the redox flow battery system 10 to monitor electrolyte chemical properties and other properties.

For example, a sensor may be positioned in an external acid tank (not shown) to monitor acid volume or pH of the external acid tank, wherein acid from the external acid tank is supplied via an external pump (not shown) to the redox flow battery system 10 in order to reduce precipitate formation in the electrolytes. Additional external tanks and sensors may be installed for supplying other additives to the redox flow battery system 10. For example, various sensors including, temperature, conductivity, and level sensors of a field hydration system may transmit signals to the controller 88. Furthermore, controller 88 may send signals to actuators such as valves and pumps of the field hydration system during hydration of the redox flow battery system 10. Sensor information may be transmitted to a controller 88 which may in turn actuate pumps 30 and 32 to control electrolyte flow through the cell 18, or to perform other control functions, as an example. In this manner, the controller 88 may be responsive to one or a combination of sensors and probes.

Redox flow battery system 10 may further comprise a source of hydrogen gas. In one example the source of hydrogen gas may comprise a separate dedicated hydrogen gas storage tank. In the example of FIG. 1, hydrogen gas may be stored in and supplied from the integrated multi-chambered electrolyte storage tank 110. Integrated multi-chambered electrolyte storage tank 110 may supply additional hydrogen gas to the positive electrolyte chamber 52 and the negative electrolyte chamber 50. Integrated multi-chambered electrolyte storage tank 110 may alternately supply additional hydrogen gas to the inlet of electrolyte rebalancing reactors 80 and 82. As an example, a mass flow meter or other flow controlling device (which may be controlled by controller 88) may regulate the flow of the hydrogen gas from integrated multi-chambered electrolyte storage tank 110. The integrated multi-chambered electrolyte storage tank 110 may supplement the hydrogen gas generated in redox flow battery system 10. For example, when gas leaks are detected in redox flow battery system 10 or when the reduction reaction rate is too low at low hydrogen partial pressure, hydrogen gas may be supplied from the integrated multi-chambered electrolyte storage tank 110 in order to rebalance the state of charge of the electro-active species in the positive electrolyte and negative electrolyte. As an example, controller 88 may supply hydrogen gas from integrated multi-chambered electrolyte storage tank 110 in response to a measured change in pH or in response to a measured change in state of charge of an electrolyte or an electro-active species.

For example, an increase in pH of the negative electrolyte chamber 50, or the negative electrode compartment 20, may indicate that hydrogen is leaking from the redox flow battery system 10 and/or that the reaction rate is too slow with the available hydrogen partial pressure, and controller 88, in response to the pH increase, may increase a supply of hydrogen gas from integrated multi-chambered electrolyte storage tank 110 to the redox flow battery system 10. As a further example, controller 88 may supply hydrogen gas from integrated multi-chambered electrolyte storage tank 110 in response to a pH change, wherein the pH increases beyond a first threshold pH or decreases beyond a second threshold pH. In the case of an IFB, controller 88 may supply additional hydrogen to increase the rate of reduction of ferric ions and the rate of production of protons, thereby reducing the pH of the positive electrolyte. Furthermore, the negative electrolyte pH may be lowered by hydrogen reduction of ferric ions crossing over from the positive electrolyte to the negative electrolyte or by protons, generated at the positive side, crossing over to the negative electrolyte due to a proton concentration gradient and electrophoretic forces. In this manner, the pH of the negative electrolyte may be maintained within a stable region, while reducing the risk of precipitation of ferric ions (crossing over from the positive electrode compartment) as $Fe(OH)_3$.

Other control schemes for controlling the supply rate of hydrogen gas from integrated multi-chambered electrolyte storage tank 110 responsive to a change in an electrolyte pH or to a change in an electrolyte state of charge, detected by other sensors such as an oxygen-reduction potential (ORP) meter or an optical sensor, may be implemented. Further still, the change in pH or state of charge triggering the action of controller 88 may be based on a rate of change or a change measured over a time period. The time period for the rate of change may be predetermined or adjusted based on the time constants for the redox flow battery system 10. For example, the time period may be reduced if the recirculation rate is high, and local changes in concentration (e.g., due to side reactions or gas leaks) may quickly be measured since the time constants may be small.

An IFB system, e.g., the flow battery system 10 of FIG. 1, may include a plurality of battery cells, such as the battery cell 18 of FIG. 1, stacked along a common axis and forming a cell stack. An IFB of the IFB system may further include a variety of hardware that provide structural support to the IFB and enable an assembly of the hardware and the cell into a transportable unit. A first example embodiment of an IFB 202 is shown in FIG. 2 from a perspective view 200. A set of reference axis 201 is provided, indicating a y-axis, an x-axis, and a z-axis. The IFB 202 may have a sandwich structure with a cell stack 204 sandwiched between a first pressure plate 206 and a second pressure plate 208, the cell stack 204 and pressure plates aligned along a longitudinal axis, e.g., the z-axis.

The first pressure plate 206 may be arranged at a first end 210 and the second pressure plate 208 may be arranged at a second end 212 of the IFB 202. The first and second pressure plates 206, 208 may be end walls of the IFB 202 lending rigid support to the IFB 202 as well as compression along the z-axis. For example, the first and second pressure plates 206, 208 allow the cell stack 204 to be compressed between the pressure plates to seal components as well as electrolyte of the IFB 202 within an interior 402 of the IFB 202, the interior 402 indicated in an exploded view 400 of the IFB 202 shown in FIG. 4.

Figure 4:
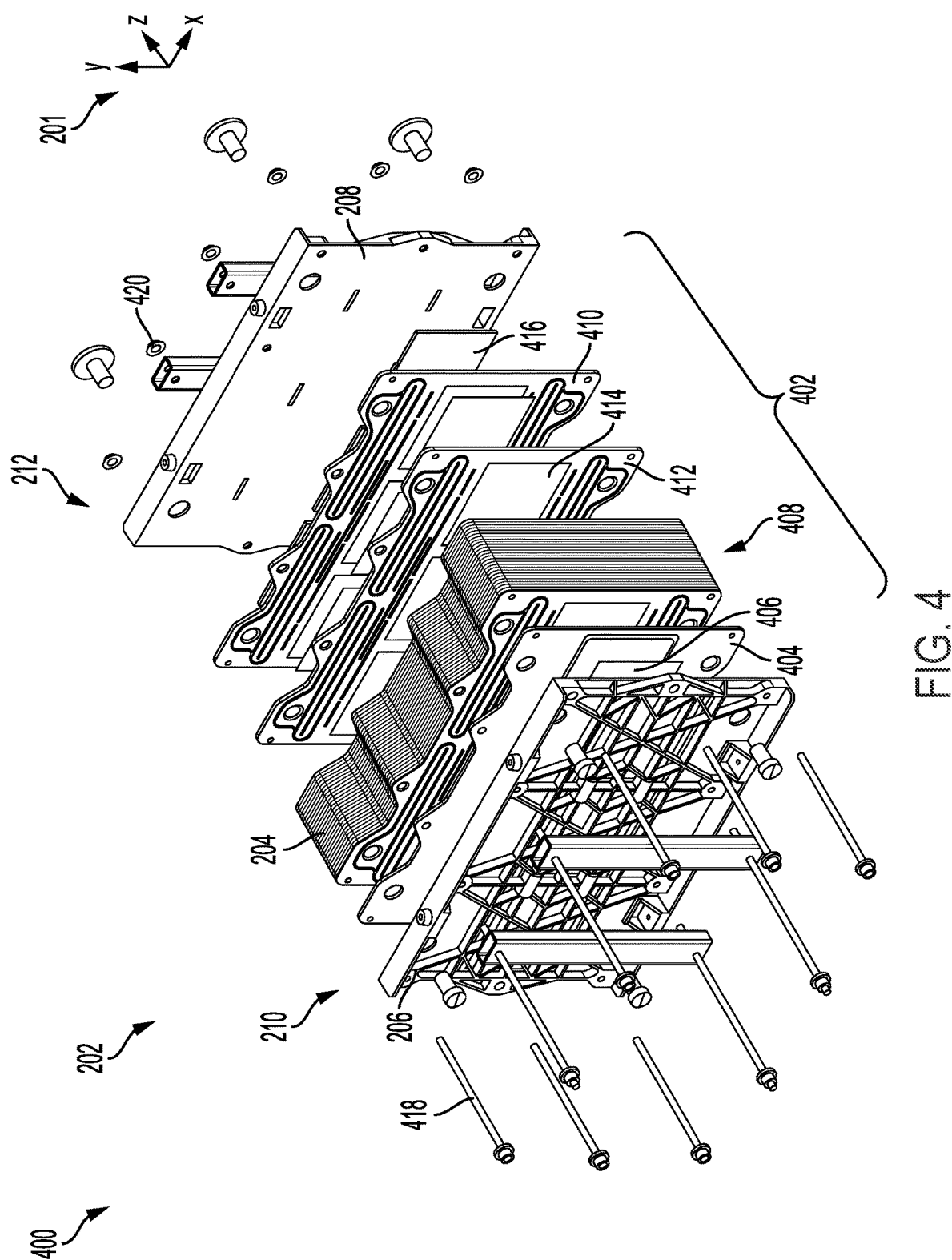
FIG. 4 shows an exploded view of the first embodiment of the redox flow battery system of FIG. 2.

Turning now to FIG. 4, elements of the IFB 202 are now described along a direction from the first end 210 towards the second end 212. The cell stack 204 includes a first, or negative end plate 404 positioned inside of the first pressure plate 206 and a first current collector 406 arranged between the negative end plate 404 and the first pressure plate 206. The first current collector 406 may have a shorter height along the y-axis than either of the negative end plate 404 and the first pressure plate 206. The negative end plate 404 may be at least partially in face-sharing contact with an interior surface of the first pressure plate 206. In other words, a surface of the first pressure plate 206 facing the interior 402 of the IFB 202 is in contact with a surface of the negative end plate 404 facing away from the interior 402 of the IFB 202 around the first current collector 406.

A bipolar plate assembly 408 is arranged between the negative end plate 404 and a second, positive end plate 410 of the cell stack 204. The bipolar plate assembly 408 includes a plurality of frame plates 412 stacked along the z-axis, the plurality of frame plates 412 providing structural support to the cell stack 204. Each frame plate of the plurality of frame plates 412 is similarly configured to frame one or more cells of the first cell stack 312 and includes a bipolar plate 414 inserted into each of at least one opening of each frame plate. Furthermore, the bipolar plate 414 is positioned between a negative electrode and a positive electrode of the one or more cells (as shown in FIGS. 7-10), the electrodes arranged along opposite faces of the bipolar plate 414. The negative electrode is positioned between the bipolar plate 414 and a membrane separator, such as the separator 24 of FIG. 1. In this way, each frame plate has a stack of components including the membrane separator, the negative electrode, the bipolar plate 414, and the positive electrode, and the stack of components is repeated with each frame plate in the cell stack 204.

As described above, the cell stack 204 extends along the z-axis from the negative end plate 404 at the first end 210 of the IFB 202 to the positive end plate 410 at the second end 212 of the IFB 202. A second current collector 416, similar to the first current collector 406 may be positioned between the positive end plate 410 and the second pressure plate 208, the second current collector 416 also configured to flow electrical current. The second current collector 416 may be shorter in height, along the y-axis, than either the positive end plate 410 or the second pressure plate 208. The positive end plate 410 may be at least partially in face-sharing contact with the second pressure plate 208. In other words, a surface of the positive end plate 410 facing away from the interior 402 of the IFB 202 is in contact with a surface of the second pressure plate 208 facing the interior 402 of the IFB 202, around the second current collector 416.

The negative and positive end plates 404, 410 may provide solid end walls to the cell stack to seal fluids, such as electrolyte, inside the cell stack 204. The cell stack 204 may be secured to the first and second pressure plates 206, 208, by a variety of hardware, including, for example, bolts 418, nuts 420, and other types of fasteners. The first and second pressure plates 206, 208, enable the IFB 202 to be compressed by a desired amount of force, such as 209 kN, as one example. Compression of the IFB 202 is maintained by the fasteners which secure components of the IFB together in series along the z-axis.

It will be appreciated that the IFB 202 shown in FIG. 2 is a non-limiting example of an IFB which may be adapted with the elements described herein. While the IFB 202 shows one cell stack 204 compressed between the first pressure plate 206 and the second pressure plate 208, other examples may include systems with differing numbers of cell stacks. As an example, a second embodiment of an IFB 302 is illustrated in FIG. 3 in a perspective view 300. The IFB 302 has a first pressure plate 304 at a first end 306 of the IFB 302 and a second pressure plate 308 at a second end 310 of the IFB 302.

A first cell stack 312 and a second cell stack 314 may be disposed between the first and second pressure plates 304, 308. Each of the first cell stack 312 and the second cell stack 314 may be similar to the cell stack 204 of the IFB 202 of FIGS. 2 and 4. The first cell stack 312 may be aligned along the z-axis and separated by a sub-stack separator plate 316 that blocks exchange of fluid between the cell stacks. In this way, an energy storage capacity of the IFB 302 may be increased relative to the IFB 202 of FIGS. 2 and 4 without increasing a number of hardware components, such as pressure plates, bolts, nuts, etc., to assemble the IFB into a transportable unit.

Figure 5:
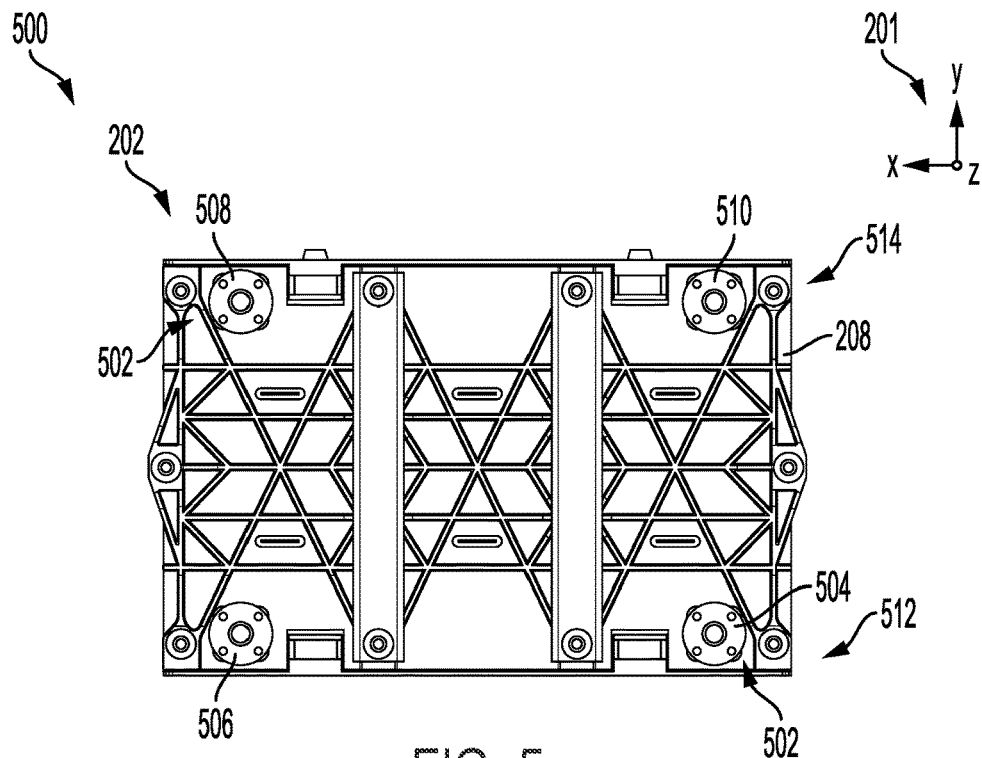
FIG. 5 shows a rear view of the first embodiment of the redox flow battery system of FIG. 2.

A rear view 500 of the IFB 202 of FIGS. 2 and 4 is shown in FIG. 5. In another example, the IFB shown in FIG. 5 may be the second embodiment of the IFB 302 depicted in FIG. 3. The second pressure plate 208, arranged at the second end 212 of the IFB 202, as shown in FIGS. 2 and 4, may have a plurality of ports 502 extending through a thickness of the second pressure plate 208 where the thickness is defined along the z-axis. In one example, the second end 212 of the IFB 202 may be a positive end of the IFB 202. A first port 504 of the plurality of ports 502 may be a negative inlet, flowing negative electrolyte into the IFB 202. A second port 506 of the plurality of ports 502 may be a positive inlet, flowing positive electrolyte into the IFB 202. A third port 508 of the plurality of ports 502 may be a negative outlet port, flowing negative electrolyte out of the IFB 202, and a fourth port 510 of the plurality of ports 502 may be a positive outlet port, flowing positive electrolyte out of the IFB 202. As such all electrolyte entering the IFB 202 enters through the second pressure plate 208 and all electrolyte leaving the IFB 202 exits through the second pressure plate 208.

Both the first port 504 and the second port 506 may be positioned at a bottom end 512, with respect to the y-axis, of the IFB 202, and may be aligned with one another along the x-axis. The third port 508 and the fourth port 510 may be positioned at a top end 514, with respect to the y-axis, of the IFB 202, also aligned with one another along the x-axis. Thus, negative electrolyte follows a negative flow path into the IFB 202 at the first port 504 along a first direction from the second pressure plate 208 to the first pressure plate 206, as shown in FIG. 6 in a side view 600 of the IFB 202 and indicated by arrow 602. The negative flow path may turn to the left (with respect to the rear view 500 shown in FIG. 5) and upwards (along the y-axis) as indicated by arrows 604 at more than one location along the z-axis between the second pressure plate 208 and the first pressure plate 206. The flow path may make another perpendicular turn to flow along a second direction from the first pressure plate 206 to the second pressure plate 208, as indicated by arrow 606, to emerge from the third port 508.

Similarly, positive electrolyte follows a positive flow path into the IFB 202 at the second port 506 along the first direction, indicated by arrow 602 in FIG. 6, the positive flow path turning to the right (with respect to the rear view 500 shown in FIG. 5) and upwards (along the y-axis) at locations along the z-axis between the second pressure plate 208 and the first pressure plate 206. The flow path turns again, perpendicularly, to flow along the second direction, as indicated by arrow 606 in FIG. 6, from the first pressure plate 206 to the second pressure plate 208 to emerge from the fourth port 510.

It will be appreciated that the IFB 202 shown in FIGS. 2 and 4-6 is a non-limiting example and other examples may include variations in electrolyte flow paths without departing from the scope of the present disclosure. For example, the electrolyte flow paths may instead enter the IFB at an upper region of the IFB and exit the IFB at a lower region of the IFB, or the electrolyte flow paths may enter and exit at a mid-region between the upper and lower regions. Furthermore, a negative electrolyte or a positive electrolyte may flow in and out of the IFB along a same side of the IFB rather than opposite sides.

A performance of an IFB may be affected by a flow rate of electrolyte within a battery cell of the IFB as well as by contact between the electrolyte and surfaces of components within the battery cell. The electrolyte flow rate may be moderated by a permeability of electrodes of the battery cell and contact between the electrolyte and reactive components, such as the membrane separator, may be regulated by a geometry of battery cell components. For example, one or more of the battery cell components may be adapted with channels to guide electrolyte flow, thereby increasing flow rates through the battery cell and promoting contact between the electrolyte and target regions of the battery cell.

In one example, a felt may be used to form the positive electrode. The felt may be a material such as carbon or graphite, or some other cost-effective, conductive material, which, when compressed via pressure exerted against the felt by the negative electrode, may provide regions of high and low permeability, thereby controlling electrolyte flow therethrough. Flow across the negative electrode may also affect a performance of the IFB. When formed from felt, the negative electrode become clogged when iron is plated onto the negative electrode during a charging cycle of the IFB. As an alternative, the negative electrode may be configured as a mesh, thus increasing a surface area of the negative electrode and allowing electrolyte to readily flow along surfaces of the negative electrode.

The felt of the positive electrode may be porous, deformable and compressible. By implementing the felt positive electrode in the IFB rather than, for example, a GDL paper, a compression of the IFB between a set of pressure plates, e.g., the first and second pressure plates 206, 208 of FIGS. 2 and 4, may be reduced. The reduced compression allows use of less costly, lower load-bearing components in the IFB. Furthermore, incorporating the more permeable and compressible positive electrode in the IFB, e.g., compared to other components in an electrode assembly of the IFB, may preclude use of a costly net-shape molded bipolar plate, enabling adjustment of electrolyte flow by modifying physical properties of the positive electrode rather than imprinting IDFF channels into the bipolar plate.

Within the battery cell, the negative electrode and the positive electrode may be separated by the membrane separator. The membrane separator may be thin and flexible which allows a compressive force exerted by the negative electrode to be transmitted through the membrane separator and imposed on the positive electrode. Regions where the negative electrode mesh contacts the membrane separator may represent regions of increased compression of the positive electrode, where pressure exerted on the positive electrode felt is supported by the bipolar plate arranged on an opposite side of the positive electrode relative to the membrane separator. A positioning of the bipolar plate resists the applied pressure from the negative electrode, resulting in compression of the positive electrode felt and altering a permeability of the positive electrode at the regions of compression. Details of compression of the positive electrode and positioning of other components of an electrode assembly for the IFB are described further below with reference to FIGS. 7-14.

Turning now to FIG. 7, an exploded view 700 of a first example of an electrode assembly 702 for an IFB is shown. The electrode assembly 702 has a central axis 701 extending longitudinally through a central point of each layer of the electrode assembly 702, the central axis 701 being parallel with the z-axis. Components of the electrode assembly 702 are stacked along the central axis 701 and may include, along a direction from a top to a bottom of the stack, a bipolar plate assembly 704, a mesh 706, and a membrane separator assembly 708. In the IFB, the electrode assembly 702 may be repeated numerous times sequentially so that each electrode assembly is adjacent to at least one other electrode assembly 702, where all the electrode assemblies are stacked within a cell stack and aligned along the z-axis, as shown in FIGS. 2-6. Electrolyte may flow through each electrode assembly, following, for example, flow paths shown in FIG. 6.

The bipolar plate assembly 704 includes a bipolar frame plate 710 framing bipolar plates 712 arranged in openings of the bipolar frame plate 710. The bipolar plates 712 may be, as an example, impermeable compressed graphite or carbon sheets providing conductivity while inhibiting exchange of electrolyte between negative electrode compartments of the electrode assembly 702. The bipolar frame plate 710 may provide structural support to the bipolar plates 712 and enable coupling of the bipolar plate assembly 704 to other components of the cell stack of the IFB. For example, the bipolar frame plate 710 and a membrane frame plate 732 of the membrane separator assembly 708 may each have apertures 715 to accommodate fasteners, such as the bolts 418 of FIG. 4. The apertures 715 may be disposed in tabs 717 which may structurally reinforce the fasteners, enabling greater force dispersion in a cell stack of the IFB. In other examples, however, other plate contours may be used.

The electrode assembly 702 also includes a negative electrolyte inlet 716, a negative electrolyte outlet 718, a positive electrolyte inlet 720, and a positive electrolyte outlet 722, which are at least partially disposed in the bipolar plate assembly 704 and partially disposed in the membrane separator assembly 708. It will be understood that the electrolyte inlets and outlets are formed via the mating between the bipolar plate assembly 704 and the membrane separator assembly 708.

A first surface 724 of the bipolar plate assembly 704, e.g., a face of the bipolar plate assembly 704 facing upwards along the z-axis, may include positive shunt channels 726 extending from the positive electrolyte inlet 720 and positive electrolyte outlet 722. The positive shunt channels 726 may be serpentine in shape to allow a length of the positive shunt channels 726 to be increased to reduce shunt current. Consequently, the battery system may be operated more efficiently with regard to energy power output and in some cases storage capacity. It will be appreciated that the cross-sectional area of the shunt channels may also be decreased to reduce shunt current, in certain examples. Furthermore, other suitable electrolyte flow paths in the positive shunt channels 726 have been envisioned.

In addition, the first surface 724 of the bipolar may also include positive inlet and outlet distribution channels 728. The positive inlet and outlet distribution channels 728 enable positive electrolyte to be distributed and captured from an active area 730 of the electrode assembly 702. Thus, the positive inlet and outlet distribution channels 728 may be in fluidic communication with the positive shunt channels 726.

An outer geometry of the bipolar frame plate 710 may match an outer geometry of the membrane frame plate 732 of the membrane separator assembly 708. The membrane frame plate 732, similar to the bipolar frame plate 710 and the bipolar plates 712, may frame membranes 734 arranged in openings of the membrane frame plate 732. The membranes 734 may be similar in size and shape to the bipolar plates 712 and may be aligned with the bipolar plates 712 along the z-axis. Alternatively, the membranes 734 may not be separate panels but instead one continuous membrane panel extending entirely across openings in the membrane frame plate 732. The membranes 734 may be non-limiting examples of the separator 24 of FIG. 1, configured to enable selective transport of ions to maintain a charge balance between a negative and a positive electrolyte. The membranes 734 may be thin and flexible and sealingly engage with the membrane frame plate 732 so that electrolyte does not flow between the membrane frame plate 732 and edges of the membranes 734.

Electrolyte flow channels may be formed at an interface of the bipolar plate assembly 704 and the membrane separator assembly 708. To elaborate, negative shunt channels 736 may extend from the negative electrolyte inlet 716 and the negative electrolyte outlet 718 of electrode assembly 702, when assembled, along a first surface 738 of the membrane separator assembly 708, e.g., a face of the membrane separator assembly 708 facing upwards along the z-axis. The negative shunt channels 736 may also extend along a second surface 740 of the bipolar plate assembly 704, e.g., a face of bipolar plate assembly 704 facing downwards along the z-axis. The negative shunt channels 736 may be serpentine in shape, similar to the positive shunt channels 726. The membrane separator assembly 708 may also include negative distribution channels 742 to enable negative electrolyte to be distributed and captured from the active area 730 of the electrode assembly 702. Thus, the negative distribution channels 742 may be in fluidic communication with the negative shunt channels 736.

It will be appreciated that the general flow path the electrolyte (e.g., positive or negative electrolyte) in the electrode assembly 702 proceeds as follows: (i) electrolyte initially flows through an electrolyte inlet into a corresponding shunt channel; (ii) electrolyte then flows from the shunt channel into the inlet distribution channels; (iii) electrolyte then flows from the inlet distribution channels into the membrane/bipolar plate interface; (iv) electrolyte then flows from the membrane/bipolar plate interface into the outlet distribution channels; (v) electrolyte then flows from the outlet distribution channels to associated shunt channels; and (vi) subsequently the electrolyte flows from the shunt channels into a respective electrolyte outlet.

The mesh 706, arranged between the bipolar plate assembly 704 and the membrane separator assembly 708, may be divided into panels 744 with dimensions matching those of the bipolar plates 712 and the membranes 734. More specifically, the panels 744 of the mesh 706 may be configured to be sandwiched, e.g., stacked, between each of the bipolar plates 712 and each of the membranes 734 aligned along the z-axis. The bipolar plates 712 may therefore be spaced away from the membranes 734 at least by a thickness of the mesh 706, the thickness defined along the central axis 701.

The mesh 706 may include ribs and cross-bracing extending between and structurally reinforcing the ribs. In one example, the mesh 706 may be constructed out of a suitable polymer (e.g., polypropylene), allowing for structural reinforcement of the cell stack without chemically interfering with the electrolyte. In another example, the mesh 706 may be configured as a negative electrode in addition to providing structural reinforcement to the electrode assembly 702. As such, the mesh 706 may be coated with a hydrophilic or conductive layer. For example, the coating may include a carbon ink, a metal oxide or a hydrophilic polymer, promoting plating and deplating of iron along surfaces of the mesh 706. The mesh 706 may be in direct contact with negative electrolyte flowing between the second surface 740 of the bipolar plate assembly 704 and the first surface of the membrane separator assembly 708, defining negative electrolyte flow paths therebetween, as described further below with reference to FIGS. 10-13.

The membrane frame plate 732 and/or the bipolar frame plate 710 may be constructed out of a suitable polymer such as chlorinated polyvinyl chloride (CPVC) and the like. The membranes 734 may be constructed out of a coated Nafion™, in one use-case example. However, other suitable membrane materials are envisioned. When assembled, the membrane separator assembly 708 and the bipolar plate assembly 704 may be adhesively bonded together. Adhesive bonding may also be used to adhere the membranes 734 to the membrane frame plate 732 and/or the bipolar plates 712 to the bipolar frame plate 710. However, other suitable attachment techniques such as heat welding have also been contemplated for attaching these components.

Figure 8:
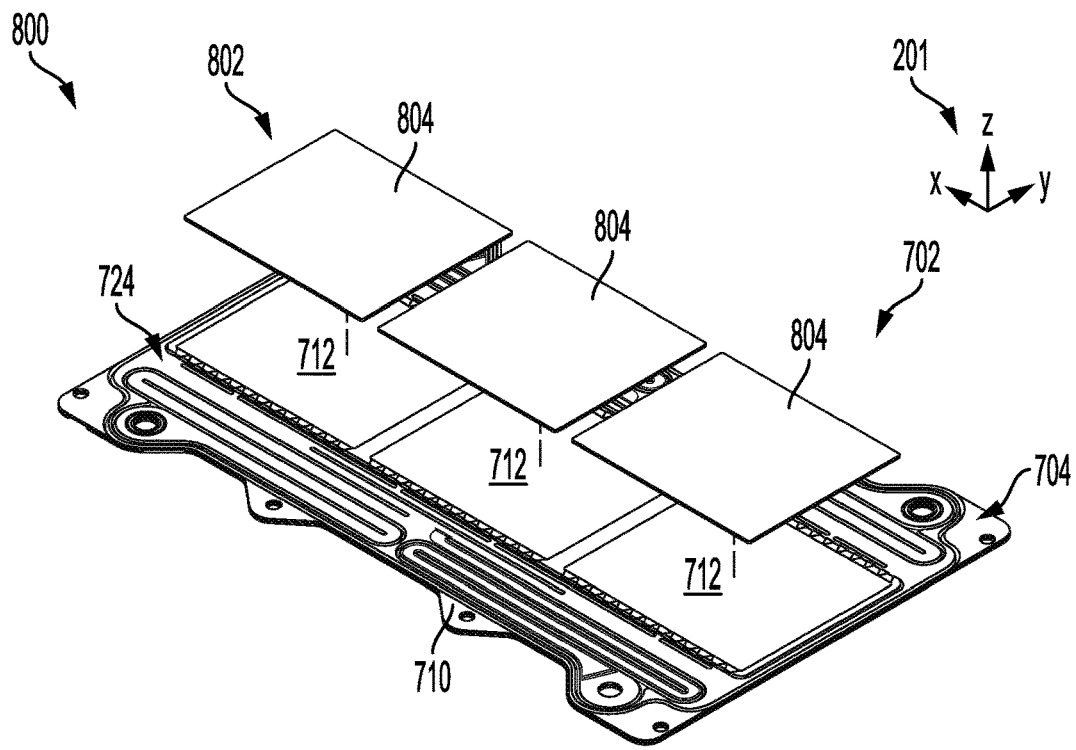
FIG. 8 shows a partially exploded view of the electrode assembly of FIG. 7 with a positive electrode.

To form the cell stack of the IFB, a positive electrode is also included in the electrode assembly 702. A partially exploded view 800 of the electrode assembly 702 is shown in FIG. 8 and the fully assembled electrode assembly 702 is depicted in FIG. 9. The bipolar plate assembly 704 is shown coupled to the membrane separator assembly 708 with the mesh 706 arranged in between in FIGS. 8 and 9, forming a single, continuous unit. A felt 802 may be coupled to the first surface 724 of the bipolar plate assembly 704. More specifically, the felt 802 may be divided into panels 804 similar in size and shape to the bipolar plates 712 of the bipolar plate assembly 704. Each of the panels 804 of the felt 802 may be face-sharing contact with the first surface 724 of each of the bipolar plates 712.

When assembled, the felt 802 may be maintained within the openings of the bipolar frame plate 710 by adhesive, heat welding etc. The felt 802 may form a positive electrode of the electrode assembly 702, in direct contact with the positive electrolyte of the IFB and may have specific physical properties that enhance a performance of the IFB. For example, the felt 802 may have a thickness, defined along the z-axis, of between 2 and 6.5 mm to provide a desired permeability of electrolyte through the felt 802. However, the thickness of the felt 802 may vary depending on the porosity of the felt and/or a viscosity of the positive electrolyte. As another example, the felt may have a compressibility between 5 to 60%. The compressibility may affect an amount of compression imposed on the entire IFB to achieve a desired mass transport across the electrode assembly 702, thus controlling an efficiency of the IFB.

When the battery cells of the IFB are stacked and compressed together between a set of pressure plates, shallow compartments may be formed along each surface of the bipolar plates 712, each shallow compartment forming either a negative electrode compartment, along the second surface 740 of each of the bipolar plates 712 or a positive electrode compartment, along the first surface 724 of each of the bipolar plates 712. The negative electrode compartment may be filled with the negative electrolyte and the positive electrode compartment filled with the positive electrolyte. Each compartment is sealed by contact between surfaces of the bipolar frame plate 710 and surfaces of the membrane frame plate 732 as the frames are pressed together along the z-axis.

One or more of the electrode assembly 702 may be included in the cell stack of the IFB. The electrode assemblies 702 may be stacked along the z-axis so that the positive electrode compartments and negative electrode compartments are ordered in an alternating pattern along the z-axis. Stacking of the electrode assemblies is shown in greater detail in FIG. 10 in a section of a cross-sectional view 1000 of an electrode assembly. For example, the section of the cross-sectional view 1000 may be taken along a line similar to line A-A' (as shown in FIG. 9) of a cell stack of an IFB.

A cell stack 1050 is illustrated in FIG. 10, including a first electrode assembly 1003 stacked over a second electrode assembly 1005 along the z-axis. Each of the first electrode assembly 1003 and the second electrode assembly 1005 may be similarly configured to the electrode assembly 702 of FIGS. 7-9. The first electrode assembly 1003 has a first membrane separator assembly 1007 with a first membrane frame plate 1052, a first membrane 1002, and a first negative electrode 1004, as well as a first bipolar plate assembly 1009 with a first bipolar frame plate 1054, a first bipolar plate 1006, and a first positive electrode 1008. Each component of the first electrode assembly 1003 may be in contact with a component directly above and a component directly below. Similarly, the second electrode assembly 1005 has a second membrane separator assembly (not shown in FIG. 10) with a second membrane frame plate 1056, a second bipolar plate assembly 1011 with a second bipolar frame plate 1058, a second negative electrode 1012, a second bipolar plate 1014, and a second positive electrode 1010 positioned immediately below the first membrane 1002. Each component of the second electrode assembly 1005 is in contact with a component directly above and a component directly below.

As described above, first negative electrode 1004 and the second negative electrode 1012 may be formed from a mesh. As such, each negative electrode has sections of material spaced uniformly apart along the x-axis and the y-axis by openings in the mesh. For example, the first negative electrode 1004 has a plurality of ribs 1016 arranged directly below and in contact with the first bipolar plate 1006 and directly above and in contact with the first membrane 1002. Cross-bracing 1015 may extend between the plurality of ribs 1016 to connect the plurality of ribs 1016 to one another. It will be appreciated that the cross-bracing 1015 includes spaces between the cross-bracing 1015 along the y-axis, where the spaces may be similar to the spaces between each of the plurality of ribs 1016. Thus, the negative electrodes may include uniformly spaced apart openings extending entirely through a thickness of the negative electrodes.

The first bipolar plate 1006 (as well as the second bipolar plate 1014) may be thicker and more rigid than the first membrane 1002. Compressive forces imposed on the IFB are thereby readily transmitted through the first membrane 1002. For example, when the cell stack 1050 is compressed between a set of pressure plates, a first applied pressure may be exerted on the second positive electrode 1010, the first membrane 1002, and the first negative electrode 1004 in a downwards direction, with respect to the z-axis, by the first bipolar plate 1006, as indicated by arrow 1018. An opposing, second applied pressure may be exerted on the second positive electrode 1010, the first membrane 1002, and the first negative electrode 1004 in an upwards direction, with respect to the z-axis, by the second bipolar plate 1014, as indicated by arrow 1020. Thus, the second positive electrode 1010, the first membrane 1002, and the first negative electrode 1004 are compressed between the first bipolar plate 1006 and the second bipolar plate 1014.

Of the positive electrodes, the membranes, and the negative electrodes, only the positive electrodes are formed from a substantially compressible material. As described above, a felt of the positive electrodes may be configured to compress by a predetermined amount, based on an anticipated amount of applied compression. A mesh of the negative electrodes may be formed from a more rigid material, such as plastic, with low compressibility. As shown in FIG. 10, a planar, bottom surface 1022 of the second positive electrode 1010 may be in face-sharing contact with a planar, top surface 1024 of the second bipolar plate 1014. Pressure exerted on the second positive electrode 1010 by the second bipolar plate 1014, which is indicated by arrow 1020, is therefore uniformly applied across a surface area of the bottom surface 1022 of the second positive electrode 1010.

At a planar, top surface 1026 of the second positive electrode 1010, the second positive electrode 1010 is spaced away from the first bipolar plate 1006 by the first negative electrode 1004. A compressive force exerted by the first bipolar plate 1006, which is indicated by arrow 1018, is transmitted to the top surface 1026 of the second positive electrode 1010 through the plurality of ribs 1016 of the first negative electrode 1004 and the first membrane 1002. Thus compression at the top surface 1026 of the second positive electrode 1010 is localized and focused at intersections of the plurality the of ribs 1016 of the first negative electrode 1004 and the second positive electrode 1010.

For example, compression of the second positive electrode 1010 may occur at a first set of zones 1028, below and aligned with each of the plurality of ribs 1016 of the first negative electrode 1004 along the z-axis. The plurality of ribs 1016 may exert a force on the top surface 1026 of the second positive electrode 1010 as indicated by arrow 1018. At the first set of zones 1028, a thickness 1030 of the second positive electrode 1010 may be reduced compared to a second set of zones 1032 of the second positive electrode 1010, the second set of zones 1032 arranged in between the first set of zones 1028. The second set of zones 1032 may be aligned, along the z-axis, with the cross-bracing 1015 of the first negative electrode 1004 as well as with openings in the first negative electrode 1004, e.g., aligned with spaces between the cross-bracing 1015 along the y-axis. The second set of zones 1032 may represent portions of the second positive electrode 1010 which experience some compression due to transmission along the x-y plane of compression exerted by the plurality of ribs 1016 of the first negative electrode 1004 but less than an amount of compression imposed at the first set of zones 1028.

The first set of zones 1028, hereafter high compression zones 1028, may be regions of low permeability due to the higher compression of the felt of the second positive electrode 1010. Compression of the felt may decrease a porosity of the felt, thereby impeding electrolyte flow therethrough. The second set of zones 1032, hereafter low compression zones 1032, may have higher permeability than the high compression zones 1028. Each positive electrode of the cell stack 1050 may therefore have alternating regions of high permeability and low permeability across the x-y plane, along alternating along both the x-axis and the y-axis. The regions of high permeability correspond to (e.g., align with along the z-axis) openings in the negative electrode mesh where the spaces may be filled with electrolyte. The regions of high permeability may have a maximum permeability based on a porosity of the uncompressed felt.

By forming regions of high permeability and regions of low permeability in the positive electrode, flow channels are created through the positive electrode, along the high permeability regions, where electrolyte flow is high relative to the regions of low permeability. Flow through the electrode assembly, and the cell stack, may be guided by forming high and low permeability regions in the positive electrode based on a geometry of the negative electrode. For example, if longer flow channels through the positive electrode are desired, a mesh with longer spaces between each rib of the plurality of ribs may be used. As another example, a mesh with smaller openings may be used if short and narrow flow channels are desired. Furthermore, an overall surface area ratio of low permeability to high permeability regions may be adjusted based on a width or depth (along the x-axis and y-axis, respectively) of the plurality of ribs and a relative width and depth of the openings between the plurality of ribs.

In the low permeability zones of the positive electrode, flow of electrolyte may be reduced by, for example, 70-90%. A small amount of electrolyte may be able to penetrate the compressed regions of the positive electrode. The compression of the low permeability zones, resulting in regions of decreased thickness of the positive electrode, forces the electrolyte to flow closer to the membrane than in the high permeability zones. The proximity of the electrolyte to the membrane in the low permeability zones promotes greater contact between the electrolyte and the membrane, and therefore higher exchange of ions across the membrane, increasing an efficiency of the IFB towards maintaining charge balance and enhancing a performance of the IFB. By forming flow channels through the positive electrode via selectively compressing regions of the positive electrode, fabrication of IDFF channels on the bipolar plate may be superfluous, allowing both the positive electrode and bipolar plate to be formed from low cost materials with less processing.

A method 1100 for operating a redox flow battery is shown in FIG. 11. The redox flow battery may be an IFB adapted with at least one cell stack aligned along a longitudinal axis of the IFB. The at least one cell stack includes a plurality of cells and each cell of the plurality of cells may be formed of one or more electrode assemblies, such as the electrode assembly 702 of FIG. 7. A positive electrode of the one or more electrode assemblies may be formed from felt while a negative electrode of the one or more electrode assemblies may be formed from mesh and the positive electrode may be separated from the negative electrode by a membrane separator. The felt of the positive electrode is configured to be more deformable and more compressible than the negative electrode, a bipolar plate of the one or more electrode assemblies, as well as pressure plates arranged at terminal ends of the IFB. The pressure plates may compress the at least one cell stack, inducing the negative electrode to apply a compressive force on the positive electrode which may be resisted by an arrangement of the bipolar plate on an opposite side of the positive electrode from the negative electrode.

At 1102, the method includes flowing electrolyte through the at least one cell stack, where electrolyte generally refers to a positive electrolyte and a negative electrolyte. Flowing electrolyte through the at least one cell stack may include flowing the positive electrolyte through high permeability zones, e.g., zones with higher permeability than compressed regions, of the positive electrode at 1104. The high permeability zones may correspond to, along the longitudinal axis, spaces or openings in the mesh of the negative electrode. The high permeability zones may be uncompressed regions of the positive electrode where flow of the positive electrolyte through the felt is highest.

Flowing electrolyte through the at least one cell stack also includes flowing positive electrolyte through low permeability zones of the felt of the positive electrode at 1106, e.g., zones of lower permeability than the high permeability zones. The low permeability zones may correspond to, along the longitudinal axis, alignment with ribs of the mesh of the negative electrode. Edges of the ribs of the mesh contact the membrane separator and press against the membrane separator with an amount of pressure that is transmitted through the membrane separator to a surface of the positive electrode in contact with the membrane separator. The pressure exerted on the positive electrode by the negative electrode compresses the felt, e.g., mechanically decreases a thickness of the positive electrode relative to when the positive electrode is not compressed, of the positive electrode to form the low permeability zones. Although the permeability of the low permeability zones is reduced compared to the high permeability zones, a small amount of electrolyte may penetrate the low permeability zones. The reduced thickness of the felt at the low permeability zones forces the small amount of electrolyte to flow adjacent to the membrane separator, thereby enabling ion exchange across the membrane separator between the positive and the negative electrolytes.

Flowing electrolyte through the at least one cell stack may further include flowing negative electrolyte along the negative electrode 1108. The negative electrolyte may be guided by the ribs of the mesh of the negative electrode to flow through the spaces or openings of the mesh and contact the membrane separator. At 1110, flowing electrolyte through the at least one cell stack may also include exchanging ions across the membrane separator to maintain charge balance between the positive and the negative electrode. For example, anions such as $Cl^-$ or $OH^-$ may be transported across the membrane separator when the membrane separator is formed from an anion exchange membrane. Alternatively, cations such as $K^+$ or $H^+$ may be transported across the membrane separator when the membrane separator is formed from a cation exchange membrane. In another example, the membrane separator may be a microporous substrate enabling exchange of both anions and cations depending on an ionic gradient across the membrane separator.

In this way, a low cost electrode assembly may be included in an IFB system, the electrode assembly incorporating a compressible positive electrode. The positive electrode may be formed from a porous and permeable material such as felt and a permeability of the felt may be adjusted by selectively compressing regions of the positive electrode. By coupling the felt positive electrode with a negative electrode formed from a mesh with lower compressibility than the felt, a geometry of the mesh determines a pattern of alternating zones of low permeability and high permeability along the positive electrode. The low permeability zones are formed by pressure exerted on the positive electrode (and transmitted through a membrane separator) by ribs of the negative electrode. The high permeability zones of the positive electrode are aligned with spaces or openings in the mesh of the negative electrode, thus providing regions of the felt with little or no compression. The low compression, high permeability zones of the positive electrode allow greater penetration and flow of electrolyte, thus providing flow channels that guide electrolyte flow through the electrode assembly. A drop in pressure along the positive electrode is reduced and a reactivity at the positive electrode is maintained high.

The technical effect of implementing a compressible positive electrode in an IFB system is that a performance of the IFB system is enhanced while maintaining low overall system costs.

The disclosure also provides support for a redox flow battery, comprising: a cell stack compressed between terminal structures defining ends of the redox flow battery, the cell stack formed of a plurality of cells, and wherein each cell of the plurality of cells includes: a deformable positive electrode having a permeability based on a mechanical compression of the positive electrode and in face-sharing contact with a first face of a membrane separator, a negative electrode configured to be less compressible than the positive electrode and arranged at a second face of the membrane separator opposite from the positive electrode, and an electrolyte in contact with the positive electrode. In a first example of the system, the positive electrode is formed from a porous and electrically conductive felt and wherein a thickness and a permeability of the felt is decreased when the felt is compressed, the thickness defined along a longitudinal axis of the redox flow battery. In a second example of the system, optionally including the first example, a first planar surface of the positive electrode is in face-sharing contact with the membrane separator and a second planar surface of the positive electrode, opposite of the first planar surface, is in face-sharing contact with a first bipolar plate. In a third example of the system, optionally including the first and second examples, the negative electrode is formed from a mesh with ribs that directly contact the membrane separator and wherein the ribs are spaced evenly apart along a plane perpendicular to the longitudinal axis and each rib extends along the longitudinal axis between the membrane separator and a second bipolar plate. In a fourth example of the system, optionally including the first through third examples, the negative electrode exerts a pressure on the positive electrode through the membrane separator in a first direction parallel with the longitudinal axis and wherein an amount of the pressure corresponds to an amount of compression of the redox flow battery provided by the terminal structures. In a fifth example of the system, optionally including the first through fourth examples, the positive electrode is compressed in a first set of zones aligned with the ribs of the mesh of the negative electrode along the longitudinal axis and the positive electrode is less compressed in a second set of zones aligned with spaces between the ribs of the mesh of the negative electrode along the longitudinal axis and wherein the first set of zones alternate with the second set of zones along a plane of the positive electrode, the plane perpendicular to the longitudinal axis. In a sixth example of the system, optionally including the first through fifth examples, the first bipolar plate exerts a pressure on the second planar surface of the positive electrode in a second direction opposite from the pressure exerted by the negative electrode and wherein the pressure exerted by the first bipolar plate is uniform across the second planar surface of the positive electrode. In a seventh example of the system, optionally including the first through sixth examples, the first set of zones of the positive electrode are regions of low electrolyte permeability and wherein the second set of zones of the positive electrode are regions with high electrolyte permeability. In an eighth example of the system, optionally including the first through seventh examples, the second set of zones of the positive electrode are flow channels enabling higher electrolyte flow through the positive electrode than the first set of zones, the flow channels configured to guide and distribute electrolyte flow through a positive electrode compartment of each cell of the plurality of cells. In a ninth example of the system, optionally including the first through eighth examples, the positive electrode is configured to be more compressible than the negative electrode, the first bipolar plate, and the terminal structures of the redox flow battery and more permeable than the membrane separator and the first bipolar plate.

The disclosure also provides support for an electrode assembly for a redox flow battery, comprising: a bipolar plate, a positive electrode with a first permeability, in face-sharing contact with the bipolar plate at a first face of the positive electrode and having regions of a second, reduced permeability, a membrane separator in face-sharing contact with a second, opposite face of the positive electrode, and a negative electrode in contact with the membrane separator, opposite of the positive electrode, and wherein the negative electrode is configured to form the regions of the second, reduced permeability in the positive electrode by compressing the positive electrode in a direction normal to a surface of the positive electrode. In a first example of the system, the positive electrode is formed of a sheet of a compressible, porous material and regions with the first permeability alternate with the regions of the second, reduced permeability along a plane of the positive electrode. In a second example of the system, optionally including the first example, the system further comprises: a mesh forming the negative electrode, the mesh having a plurality of ribs connected by cross-bracing, the plurality of ribs arranged in a plane parallel with the plane of the positive electrode and the cross-bracing arranged perpendicular to the plurality of ribs, also in the plane parallel with the plane of the positive electrode, and wherein the negative electrode is less compressible than the positive electrode. In a third example of the system, optionally including the first and second examples, a compressive force exerted by the negative electrode on the positive electrode is transmitted through the membrane separator and resisted by the bipolar plate and wherein the compressive force is applied only in regions where the plurality of ribs of the negative electrode contacts the membrane separator. In a fourth example of the system, optionally including the first through third examples, the regions of the positive electrode aligning, along a direction normal to the surface of the positive electrode, with the regions where the plurality of ribs of the negative electrode contacts the membrane separator are the regions of the second, reduced permeability in the positive electrode. In a fifth example of the system, optionally including the first through fourth examples, electrolyte flow in the regions of the first permeability is greater than electrolyte flow in the regions of the second, reduced permeability and wherein electrolyte flowing through the regions of the second, reduced permeability flows through zones with a decreased thickness of the positive electrode relative to when the regions of the second, reduced permeability are not compressed.

The disclosure also provides support for a method for operating a redox flow battery, comprising: flowing a positive electrolyte through a compressible positive electrode having a first set of zones with a first permeability and a second set of zones with a second, lower permeability. In a first example of the method, the method further comprises: flowing a negative electrolyte across a negative electrode, wherein the negative electrode is formed of a mesh configured to exert a compressive force on the positive electrode. In a second example of the method, optionally including the first example, flowing the positive electrolyte through the positive electrode includes flowing more positive electrolyte through the first set of zones than the second set of zones. In a third example of the method, optionally including the first and second examples, flowing the positive electrolyte through the second set of zones includes flowing the positive electrolyte adjacent to a membrane separator positioned between the positive electrode and the negative electrode and enabling ion exchange between the positive electrolyte and a negative electrolyte across the membrane separator.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A redox flow battery, comprising:
a cell stack comprising a plurality of cells, each cell of the plurality of cells comprising:
a positive electrode and a negative electrode, wherein the positive electrode comprises a first set of zones with a first permeability and a second set of zones with a second permeability different than the first permeability, and wherein zones of the first set of zones alternate with zones of the second set of zones.

2. The redox flow battery of claim 1, wherein the second permeability is less than the first permeability.

3. The redox flow battery of claim 1, wherein a compressibility of first set of zones is less than a compressibility of the second set of zones.

4. The redox flow battery of claim 1, wherein a size of each of the first set of zones is different than a size of each of the second set of zones.

5. The redox flow battery of claim 1, wherein the positive electrode is a positive felt electrode arranged between a bipolar plate and a membrane.

6. The redox flow battery of claim 1, wherein the positive electrode is deformable, the negative electrode is configured to be less compressible than the positive electrode, and wherein the positive electrode is in face-sharing contact with a first face of a membrane separator and the negative electrode is in face-sharing contact with a second face of the membrane separate, the second face opposite the first face.

7. The redox flow battery of claim 1, wherein the negative electrode is formed from a mesh with ribs that directly contact a membrane separator in face-sharing contact with the positive electrode and wherein the ribs are spaced evenly apart along a plane perpendicular to a longitudinal axis parallel to a thickness of the redox flow battery, and each rib extends along the longitudinal axis between the membrane separator and a second bipolar plate.

8. The redox flow battery of claim 7, wherein the positive electrode is more compressed in the first set of zones aligned with the ribs of the mesh of the negative electrode along the longitudinal axis and the positive electrode is less compressed in the second set of zones aligned with spaces between the ribs of the mesh of the negative electrode along the longitudinal axis, and wherein the first set of zones alternate with the second set of zones along a plane of the positive electrode, the plane perpendicular to the longitudinal axis.

9. An assembly for a redox flow battery, comprising:
a positive electrode comprising higher permeability regions and lower permeability regions;
a negative electrode configured to compress the lower permeability regions of the positive electrode; and
a bipolar plate arranged between the positive electrode and the negative electrode, wherein the negative electrode comprises a plurality of ribs that align with the lower permeability regions of the positive electrode.

10. The assembly for the redox flow battery of claim 9, wherein adjacent ribs of the plurality of ribs are separated by spaces of a plurality of spaces, and wherein the spaces align with the higher permeability regions of the positive electrode.

11. The assembly for the redox flow battery of claim 9, wherein the plurality of spaces is larger than the plurality of ribs.

12. The assembly for the redox flow battery of claim 9, wherein the negative electrode is formed by a mesh, and wherein a cross-bracing is connected to the plurality of ribs, each of the cross-bracing and the plurality of ribs arranged in a plane parallel to a plane of the positive electrode.

13. The assembly for a redox flow battery of claim 9, wherein a compressive force exerted by the negative electrode on the positive electrode is transmitted through the membrane separator and resisted by the bipolar plate, and wherein the compressive force is applied only in regions where a plurality of ribs of the negative electrode contacts the membrane separator.

14. A system for a redox flow battery, comprising:
a compressible positive electrode having a first set of zones with a first permeability and a second set of zones with a second, lower permeability;
a negative electrode configured to compress the lower permeability regions of the positive electrode; and
a bipolar plate arranged between the positive electrode and the negative electrode,
wherein a compressive force exerted by the negative electrode on the positive electrode is transmitted through the membrane separator and resisted by the bipolar plate, and wherein the compressive force is applied only in regions where the plurality of ribs of the negative electrode contacts the membrane separator.

15. The system for the redox flow battery of claim 14, further comprising a negative electrode formed of a mesh and configured to exert a compressive force on the second set of zones.

16. The system for the redox flow battery of claim 15, wherein a membrane separates the compressible positive electrode from the negative electrode.

17. The system for the redox flow battery of claim 16, wherein the negative electrode comprises a plurality of ribs connected to a cross-bracing, wherein the plurality of ribs and the cross-bracing are in face-sharing contact with the membrane, and wherein only the plurality of ribs is in face-sharing contact with a bipolar plate.

18. The system for the redox flow battery of claim 17, wherein the bipolar plate is a first bipolar plate, further comprising a second bipolar plate in contact with the positive electrode.

* * * * *